United States Patent
Matsuzawa et al.

(10) Patent No.: US 9,766,824 B2
(45) Date of Patent: Sep. 19, 2017

(54) STORAGE DEVICE AND COMPUTER SYSTEM

(71) Applicant: Hitachi, Ltd., Tokyo (JP)

(72) Inventors: Keiichi Matsuzawa, Tokyo (JP); Hitoshi Kamei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 14/767,066

(22) PCT Filed: Nov. 26, 2013

(86) PCT No.: PCT/JP2013/081785
§ 371 (c)(1),
(2) Date: Aug. 11, 2015

(87) PCT Pub. No.: WO2015/079494
PCT Pub. Date: Jun. 4, 2015

(65) Prior Publication Data
US 2016/0011809 A1    Jan. 14, 2016

(51) Int. Cl.
*G06F 3/06* (2006.01)
*G06F 12/0802* (2016.01)
(Continued)

(52) U.S. Cl.
CPC ............ *G06F 3/0619* (2013.01); *G06F 3/065* (2013.01); *G06F 3/067* (2013.01); *G06F 3/0655* (2013.01);
(Continued)

(58) Field of Classification Search
CPC ...... G06F 3/0619; G06F 3/067; G06F 3/0689; G06F 3/0665; G06F 3/065;
(Continued)

(56) References Cited

U.S. PATENT DOCUMENTS 4,371,929 A * 2/1983 Brann ................... G06F 12/084
700/5
6,789,156 B1    9/2004 Waldspurger
(Continued)

OTHER PUBLICATIONS

International Search Report of PCT/JP2013/081785.

*Primary Examiner* — Hiep Nguyen
(74) *Attorney, Agent, or Firm* — Mattingly & Malur, PC

(57) ABSTRACT

When computers and virtual machines operating in the computers both attempt to allocate a cache regarding the data in a secondary storage device to respective primary storage devices, identical data is prevented from being stored independently in multiple computers or virtual machines. An integrated cache management function in the computer arbitrates which computer or virtual machine should cache the data of the secondary storage device, and when the computer or the virtual machine executes input/output of data of the secondary storage device, the computer inquires the integrated cache management function, based on which the integrated cache management function retains the cache only in a single computer, and instructs the other computers to delete the cache. Thus, it is possible to prevent identical data from being cached in a duplicated manner in multiple locations of the primary storage device, and enables efficient capacity usage of the primary storage device.

3 Claims, 21 Drawing Sheets

(51) Int. Cl.
  *G06F 12/084* (2016.01)
  *G06F 12/0866* (2016.01)
  *G06F 9/455* (2006.01)

(52) U.S. Cl.
  CPC .......... *G06F 3/0665* (2013.01); *G06F 3/0689* (2013.01); *G06F 9/45558* (2013.01); *G06F 12/0802* (2013.01); *G06F 12/084* (2013.01); *G06F 12/0866* (2013.01); *G06F 2009/4557* (2013.01); *G06F 2009/45562* (2013.01); *G06F 2009/45583* (2013.01); *G06F 2212/224* (2013.01); *G06F 2212/284* (2013.01); *G06F 2212/285* (2013.01)

(58) Field of Classification Search
  CPC .............. G06F 12/0802; G06F 12/084; G06F 12/0866; G06F 9/45558; G06F 2212/284; G06F 2212/285; G06F 2212/224; G06F 2209/4557; G06F 2209/45562
  See application file for complete search history.

(56) References Cited

U.S. PATENT DOCUMENTS

| | | | |
|---|---|---|---|
| 2003/0115346 A1* | 6/2003 | McHenry | H04L 67/2847 709/229 |
| 2004/0010562 A1* | 1/2004 | Itonaga | H04L 12/4645 709/213 |
| 2004/0215883 A1* | 10/2004 | Bamford | G06F 17/3048 711/129 |
| 2007/0033341 A1* | 2/2007 | Hashimoto | G06F 12/084 711/113 |
| 2013/0246825 A1* | 9/2013 | Shannon | G06F 1/3275 713/324 |

\* cited by examiner

| VOLUME ID | CHUNK NUMBER | MASTER (OWNER) | MEMORY ADDRESS | SLAVE (HOLDER) |
|---|---|---|---|---|
| 0 | 0x1000 | A | 0x5001000 | A |
| 0 | 0x2000 | A | 0x5002000 | A |
| 1 | 0x3000 | STORAGE | 0x1005000 0x3005000 0x4005000 0x5005000 | A,B,C, STORAGE |
| 1 | 0x4000 | STORAGE | 0x1006000 | STORAGE |
| ... | ... | ... | ... | ... |
| 2 | 0x3000 | B | 0x4003000 | B |
| ... | ... | ... | ... | ... |

510 520 530 540 550

561 — row 1
562 — row 2
563 — row 3
564 — row 4
565 — row 6

| VOLUME ID | CHUNK NUMBER | LAST WRITE TIME | LAST READ TIME | WRITE FREQUENCY | READ FREQUENCY |
|---|---|---|---|---|---|
| 0 | 0x0000 | 01:00 | 00:59 | 100 | 200 |
| 0 | 0x0001 | NULL | 00:10 | 0 | 100 |
| 1 | 0x0002 | NULL | 00:10 | 0 | 200 |
|  |  |  |  |  |  |
|  |  |  |  |  |  |

Columns: 571, 572, 573, 574, 575, 576
Rows: 561, 562, 563, 564, 565

| VOLUME ID | CHUNK NUMBER | MEMORY ADDRESS | CACHE NECESSITY |
|---|---|---|---|
| 0 | 0x1000 | 0x5001000 | 1 |
| 0 | 0x2000 | NULL | 0 |
| 1 | 0x5000 | NULL | 0 |
| 1 | 0x6000 | 0x1006000 | 1 |
| 2 | 0x3000 | 0x4003000 | 1 |
| | | | |
| | | | |

STORAGE DEVICE AND COMPUTER SYSTEM

TECHNICAL FIELD

The present invention relates to a storage system and a computer system having a cache management function of a storage device.

BACKGROUND ART

Secondary storage devices such as hard disks in computers generally have greater capacity compared to primary storage devices such as memories and lower performance. Therefore, a cache technique is used widely to replicate and allocate a portion of the data in the secondary storage device to the primary storage device in order to increase the speed of access to data stored in the secondary storage device. Further, there are computers having large-capacity secondary storage devices and primary storage devices, which can provide a data storage function where the computer itself can be used as a secondary storage device of other computers, and such computers are sometimes called External Controller-Based (ECB) Disk Storages.

In an ECB and a host computer using the same, the host computer regards the ECB as a secondary storage device, so that the primary storage device of the host computer itself is used as a cache area of the ECB, and the ECB uses the primary storage device in the ECB as a cache for the secondary storage device. Therefore, the caches of the identical data in the secondary storage device of the ECB are retained in duplexed manner both in the host computer and the ECB, which deteriorates the efficiency of use of the primary storage device of both computers.

A similar event occurs in a virtual machine technique. A virtual machine technique is a technique for emulating the various hardware constituting a computer by the software in a single computer so that the computer behaves as if multiple computers virtually exist. Here, the computer provides a virtual storage device to the virtual machine. At this time, when data is stored in a storage media provided to the computer via a emulated storage device provided to the virtual machine by the computer, the virtual machine uses its own primary storage device as cache. At this time, the computer transfers an input/output request that the virtual machine issues to the emulated storage device and the storage target data in its own secondary storage device, but at that time, the computer itself uses the internal primary storage device as the cache. In the virtual machine technique, the primary storage device and the secondary storage device are shared among computer and virtual machines by dividing the capacity of the storage devices. However, if both the computer and the virtual machines use their own internal primary storage devices as cache, multiple caches of the secondary storage device of the computer will exist. When multiple virtual machines are operated, it may be possible that a cache of the secondary storage device is multiplexed by a number corresponding to the number of virtual machines and the computer and retained in the primary storage device, so that the efficiency of use of the primary storage device is deteriorated. Such state may occur when multiple virtual machines, such as virtual machines performing data search and virtual machines performing data analysis, perform input/output of the same data.

Patent Literature 1 teaches an art of deleting duplicated data in a primary storage device within a virtual machine environment. Patent Literature 1 teaches a technique to refer to detect the duplicated data stored in the primary storage devices of the computer and virtual machines by referring to the contents of data in the primary storage device, and to delete the same.

CITATION LIST

Patent Literature

[PTL 1] U.S. Pat. No. 6,789,156

SUMMARY OF INVENTION

Technical Problem

In the art taught in Patent Literature 1, a long processing time is required to detect duplicated data since it refers to the contents of the data in the primary storage device. Further, when data is updated, re-detection of duplicated data is required, so that in an environment where data update occurs frequently, a drawback occurs in that the processing overhead of the computer becomes too large.

The object of the present invention is to efficiently solve the problem of duplication of cache data in multiple computers and virtual machines.

Solution to Problem

The present invention aims at preventing identical data from being stored in a duplicated manner in multiple computers and virtual machines when the multiple computers and virtual machines attempt to allocate a cache of the data from the same secondary storage device to the respective primary storage devices.

The computer according to one preferred embodiment of the present invention has one or more virtual machines, and each of the computer and the virtual machines has a cache area utilizing a primary storage media of the computer to cache data from the secondary storage device. The integrated cache management function in the computer communicates with the cache management function of the virtual machines, and arbitrates which computer or virtual machine should cache the data in the secondary storage device into the cache area. When the computer or the virtual machine performs input/output of data of the secondary storage device, unnecessary cache is deleted by sending an inquiry to the integrated cache management function.

Advantageous Effects of Invention

The present invention enables to prevent identical data from being cached in a duplicated manner to multiple positions in a primary storage device, and to efficiently utilize the areas of the primary storage device.

BRIEF DESCRIPTION OF DRAWINGS

FIG. 5 is a view illustrating an example of a cache management table.

FIG. 6 is a view illustrating an example of statistical information.

DESCRIPTION OF EMBODIMENTS

Now, the preferred embodiments of the present invention will be described with reference to the drawings. The present invention is not restricted to the embodiments described below. Some descriptions of the present specification stating that "a program executes a process" may seem as if the program is the subject of an operation executing a specific process, but it actually means that a hardware such as a processor of a computer is executing the program.

Embodiment 1

Figure 1:
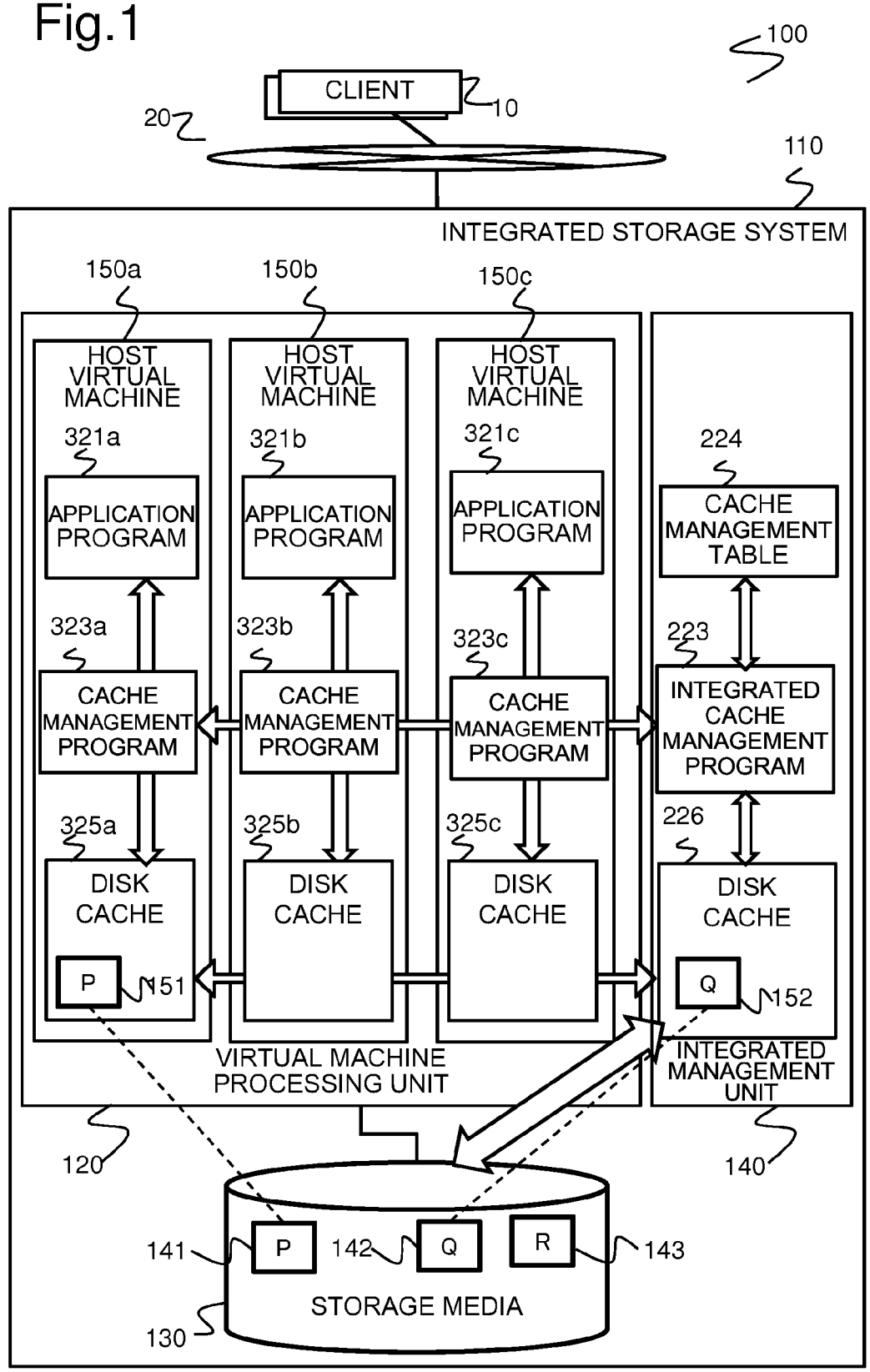
FIG. 1 is a view illustrating an outline of the present invention.

An outline of Embodiment 1 according to the present invention will be described with reference to FIG. 1. FIG. 1 illustrates a configuration of a computer system 100 which is a target of applying an integrated storage system 110 according to Embodiment 1 of the present invention. The computer system 100 adopts a configuration where one or more client computers 10 (hereinafter abbreviated as "client") and an integrated storage system 110 are coupled via a network 20. The integrated storage system 110 has a storage media 130, and carries out a process to perform input and output of data in the storage media 130 in response to a data input/output (I/O) request from the client 10. A data input/output unit within the storage media 130 is called a chunk. Further, a disk cache 226 provided in the integrated storage system 110 is an area used temporarily for performing input and output of the chunk within the storage media 130, and it is a cache area that is also used thereafter for temporarily retaining a replica of the chunk within the storage media 130.

The integrated storage system 110 has a virtual machine processing unit 120 provided therein, and the virtual machine processing unit 120 includes multiple host virtual machines 150a, 150b and 150c (in the following description, when the host virtual machines 150a, 150b and 150c are not distinguished, they are referred to as "host virtual machine 150"). Application programs 321a, 321b and 321c which perform predetermined processes by using (reading or writing) the data within the storage media 130 are running in each of the host virtual machines 150a, 150b and 150c. The application programs 321a, 321b and 321c can be, but are not restricted to, file server programs providing file access services to the client 10 such as an NFS server, or programs providing search services thereto. Further, the disk caches 325a, 325b and 325c that the respective host virtual machines 150a, 150b and 150c include are areas temporarily used for input/output of data chunks in the storage media 130 via the disk cache 226 in the integrated storage system 110, and are cache areas used thereafter for temporarily retaining the replica of the chunks within the storage media 130. Additionally, which of the disk caches 226, 325a, 325b and 325c should be used to retain data in the respective areas of the storage media 130 is determined by the cache management programs 323a, 323b and 323c within the respective host virtual machines 150a, 150b and 150c communicating with an integrated cache management program 223 within the integrated storage 110 and exchanging the input/output statuses.

Now, the processing performed in the host virtual machine 150a will be described as an example, but the host virtual machines 150b and 150c operate in a similar manner. When the application program 321a in the host virtual machine 150a performs input/output of data in the storage media 130, the cache management program 323a determines whether the target chunk is cached in its own disk cache 325a or not. For example, the data of chunk P (141) is cached as a replica P (151) in the disk cache 325a, and in this case, the input/output of data to the chunk P (141) is done by referring to the replica P (151). The input/output of data to the chunk Q (142) is performed by requesting input/output to the chunk Q (142) to an integrated management unit 140, since it does not have a replica Q in the disk cache 325a. The integrated cache management program 223 within the integrated management unit 140 similarly determines that the data replica Q (152) of the chunk Q (142) is stored in the disk cache 226, and returns the result to the host computer 150a. Regarding input/output of data regarding the chunk R (143), there is no data replica of the chunk R (143) in any of the disk caches, so that the host virtual machine 150a outputs an input/output request to the integrated management unit 140, and performs data input/output of the storage media 130. As described, the number of input/output performed with respect to the storage media 130 varies based on whether a replica exists in the respective disk caches or not.

Further, the integrated cache management program 223 checks the status of input/output regarding the respective host virtual machines 150a, 150b and 150c, selects a disk cache storing the replica of the chunk in the storage media 130, and deletes the unnecessary replica. For example, if only the application program 321a accesses the chunk P (141), the replica P is stored in the disk cache 325a within the same host virtual machine 150a, and the data replicas of the chunk P (141) existing in the disk caches 226, 325b and 325c, if any, are deleted. If all application programs 321a, 321*b* and 321*c* access the chunk Q (142), then the replica Q (152) is stored in the disk cache 226 of the integrated storage 110, and the chunk replica retained in the disk cache 325 of the host virtual machine 150 is deleted.

As described, by storing replicated chunks in response to the input/output statuses of the respective chunks, and by preventing multiple replicas for a single chunk data from being located in the disk caches, it becomes possible to reduce the capacity of use of the disk caches, and to have greater numbers of replicated chunks to be retained in the respective disk caches as a whole. The present invention is especially preferable for application to large-scale integrated storage systems.

Figure 2:
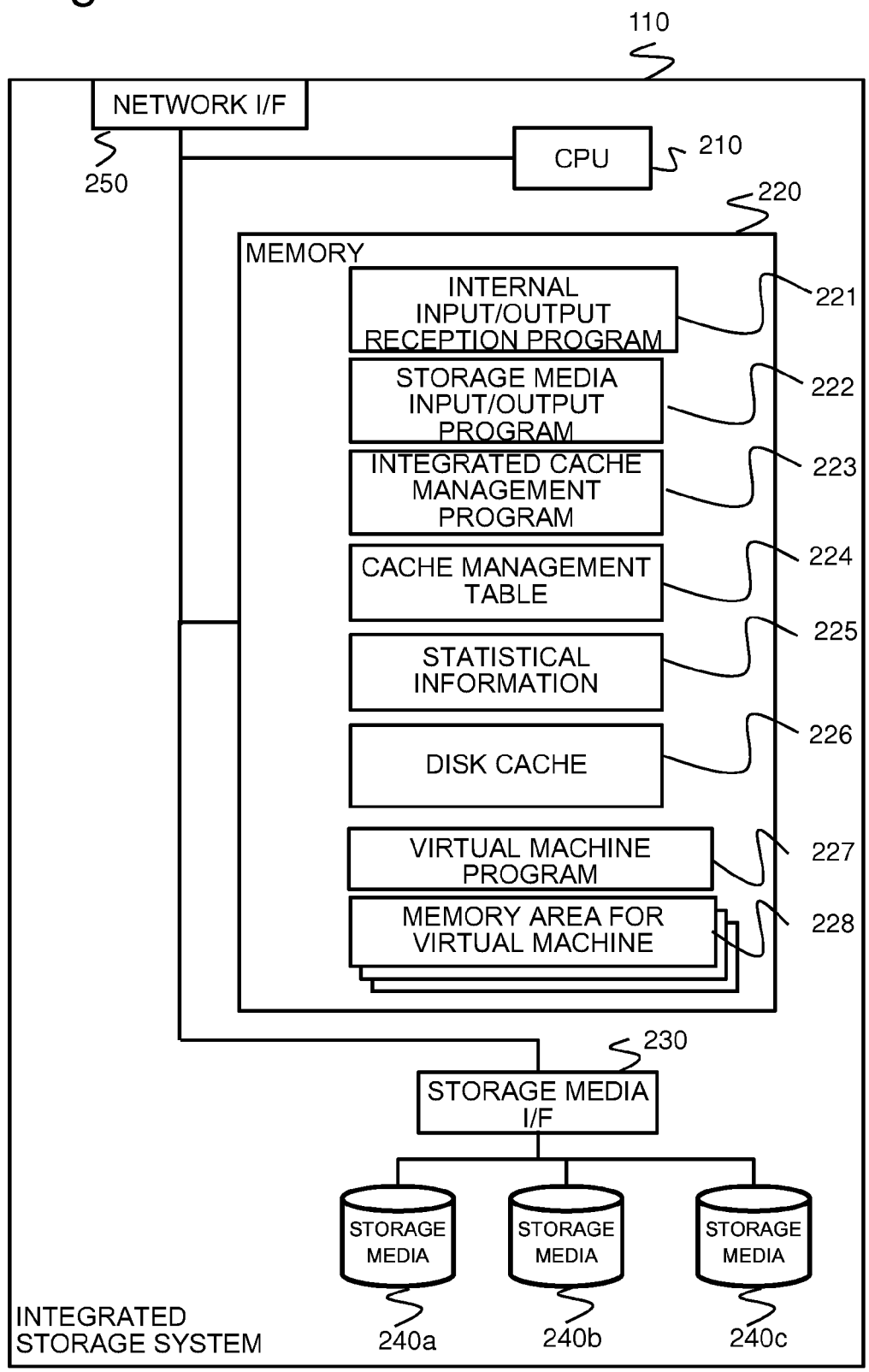
FIG. 2 is a configuration diagram of an integrated storage system according to Embodiments 1 and 2.

Hereafter, the respective components and operations of the computer system 100 will be described. FIG. 2 illustrates a configuration diagram of the integrated storage system 110. The integrated storage system 110 is composed of a processor (hereinafter called a CPU (Central Processing Unit)) 210, a memory 220 which is a primary storage device, a storage media interface (storage media I/F) 230, and one or more storage media (240*a*, 240*b*, 240*c*; hereafter, the storage media 240*a*, 240*b* and 240*c* are collectively called "storage media 240"), and a network interface (network I/F) 250. The CPU 210 reads the various programs in the memory 220, and based on the instructions therefrom, controls the various components of the integrated storage system 110. The network I/F 250 is an interface for connecting the integrated storage system 110 to the network 20 (in FIG. 1), wherein the integrated storage system 110 (or the host virtual machine 150) communicates (such as transmit/receive file access requests) with the clients 10 via the network I/F 250.

The memory 220 includes programs running in the integrated storage system 110, areas used for retaining information used by the program, and areas used as disk cache 226. A volatile storage element such as a DRAM can be used as the memory 220. It is also possible to use a nonvolatile storage element such as a flash memory. It is further possible to form the memory used for storing programs and information used by the programs and the area used as the disk cache 226 as physically different memories, and in that case, the memory used for storing programs and information used by the programs can be formed of a volatile storage element, and the area used as the disk cache 226 can be formed of a nonvolatile storage element such as a flash memory.

The internal input/output reception program 221 within the memory 220 receives an input/output request from the host virtual machine 150 and executes the input/output processing of the storage media 240. The internal input/output reception program 221 also provides a volume construction function. A volume is a logical storage area created by gathering storage areas from multiple storage media 240. Various well-known methods such as striping or coupling of storage media, Redundant Arrays of Independent Disks (RAID), thin provisioning and the like can be used as the method for constructing volumes. Based on these volume construction functions, the integrated storage system 110 can compose one or multiple volumes that do not depend on the number or capacity of the storage media 240, and provide them to the host virtual machine 150. Each volume is managed by assigning a unique identification number within the integrated storage system 110. This identification number is called a volume ID. A volume is accessed from the host virtual machine 150 or the like, and the unit of access is a fixed size area called a chunk. Then, in order to uniquely specify each chunk, numbers 0, 1, 2, and so on are assigned sequentially from the leading chunk to the respective chunks in the volume, and these numbers are called chunk numbers. According to the integrated storage system 110 of the present embodiment, the size of the chunk is a minimum unit (data size) that the host virtual machine 150 or the internal input/output reception program 221 can access, and the size can be set to a single block (512 bytes), or 4 KB, for example.

The storage media input/output program 222 within the memory 220 performs reading/writing of data within the storage media 240 via the storage media interface 230. The integrated cache management program 223 in the memory 220 is a program for managing where the data of the chunks within the volume are cached on which disk cache (the disk cache 226 or the disk cache 325), and for performing control such as to cache the data of a chunk in the volume in the disk cache 226. The cache management table 224 within the memory 220 is a table for storing the allocation information of the chunk. The statistical information 225 in the memory 220 aggregates the performance information and the number of input/output processes of the integrated storage system 110 and the respective host virtual machines 150, which is used by the integrated cache management program 223 to determine the disk cache to be set as the cache destination of the chunk.

The disk cache 226 in the memory 220 is an area temporarily used for performing input/output of the data of the chunk in the volume, and it is also a cache area used thereafter for temporarily retaining a replica of the chunk data. A virtual machine program 227 in the memory 220 is a program for creating and activating multiple virtual machines (the host virtual machines 150 of FIG. 1) within a computer, and logical partitioning of resources or hypervisor methods are known as methods for realizing the same. The virtual machine program 227 provides computer resources such as CPUs, memories, volumes and internal communication paths to the virtual machines. Memory areas for virtual machine 228 within the memory 220 are the areas allocated as a memory for each of the virtual machines when multiple virtual machines are created. The allocation information thereof is managed by the virtual machine program 227. In the present embodiment, the subject providing services such as the file access service to the client 10 is the host virtual machine 150 described later, but as another embodiment, the integrated storage system 110 can be designed to have a configuration with a function for providing a volume access or file access service to the client 10, and the present invention is also effective in such configuration.

The storage media 240 is a device for performing input/output of data. A storage media, such as an optical disk, a magnetic disk, a tape device or a nonvolatile memory like a flash memory, can be utilized as the storage media 240. The integrated storage system 110 performs input/output of data of the storage media 240 via the storage media interface 230. The storage media interface 230 can adopt ATA (AT Attachment) interface, SCSI (Small Computer System Interface), SAS (Serial Attached SCSI), and so on.

Figure 3:
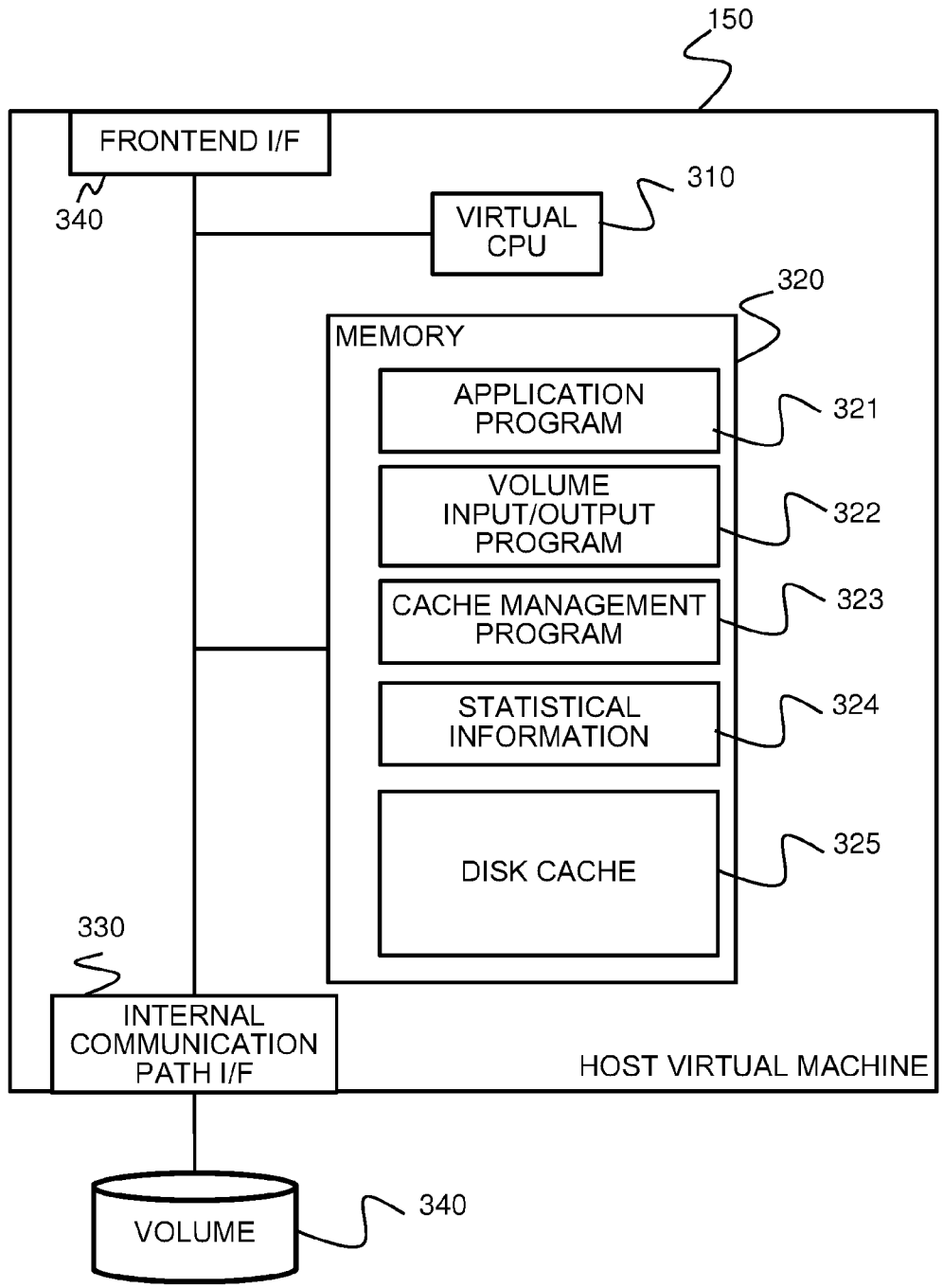
FIG. 3 is a configuration diagram of a host virtual machine according to Embodiments 1 and 2.

FIG. 3 illustrates a configuration diagram of the host virtual machine 150. The host virtual machine 150 is composed of a virtual CPU 310, a memory 320, an internal communication path interface 330, and a frontend interface (frontend I/F) 340. The virtual CPU 310, the memory 320, the internal communication path interface 330 and the frontend I/F 340 are so-called components of the virtual machine, so that these components do not physically exist independently from the integrated storage system 110, and they are realized virtually using a portion of the CPU, the memory 220 and so on included in the integrated storage system 110 by having the virtual machine program 227 illustrated in FIG. 2 executed by the CPU.

The virtual CPU 310 reads the various programs within the memory 320, and based on the instructions from the programs, controls the various components of the host virtual machine 150.

The memory 320 is used for retaining programs executed by the host virtual machine 150 and the information used by the programs. Hereafter, the outline of the programs and information stored in the memory 320 will be described.

An application program 321 is a program for executing computing that the user of the computer system 100 wishes to perform using the data stored in the storage media 240. A volume input/output program 322 is a program for performing input/output via the internal communication path interface 330 of data of a volume 340 that the integrated storage system 110 constructs from a storage device 240. A cache management program 323 is a program for performing control to cache the chunk data in the volume to the disk cache 325. Further, based on the instruction from the integrated cache management program 223, the data in the disk cache 325 is transferred (copied) to the integrated cache management program 223.

A statistical information 324 aggregates the status of accesses (such as the frequency of input/output processing) to volumes 340 of the host virtual machines 150, and this information is used by the integrated cache management program 223 or the cache management program 323 when determining the cache destination of the chunk.

The disk cache 325 is an area used for temporarily performing input/output of the chunk data in the volume 340, and it is also a cache area used thereafter for temporarily storing the replica of the chunk data. According to the integrated storage system 110 of the present embodiment, as shown in FIG. 1, there are multiple (such as three) host virtual machines 150, so that when it is necessary to distinguish the respective host virtual machines 150, they are referred to as host virtual machines 150a, 150b and 150c. Further, if it is necessary to distinguish the respective components such as the disk caches 325 in the host virtual machines 150, they are referred to as disk caches 325a, 325b and 325c, and so on.

According to the integrated storage system 110 of Embodiment 1 of the present invention, the disk caches 325a, 325b and 325c that the respective host virtual machines 150a, 150b and 150c have and the disk cache 226 of the integrated storage system 110 are respectively different areas, and the cache management program 323 of each host virtual machine 150 only manages the memory space of the disk cache 325 of its own virtual machine. In other words, the disk cache 325 that each host virtual machine 150 has is a non-shared area that cannot be accessed from other host virtual machines 150. The disk cache 226 in the integrated storage system 110 is also an area that cannot be directly accessed from the respective host virtual machines 150.

The internal communication path interface 330 is an interface used for performing input/output to/from the volume 340, or for communicating cache control information and statistical information 324 with the integrated cache management program 223.

The volume 340 is a single logical storage area created by the integrated storage system 110, and the respective host virtual machines 150 according to the present invention can access the same volume 340 (in other words, the volume 340 can be subjected to shared access). Although not shown, it is possible to provide a volume that can only be accessed by a specific host virtual machine 150 independently from the volume 340 subjected to shared access from multiple host virtual machines 150.

Figure 4:
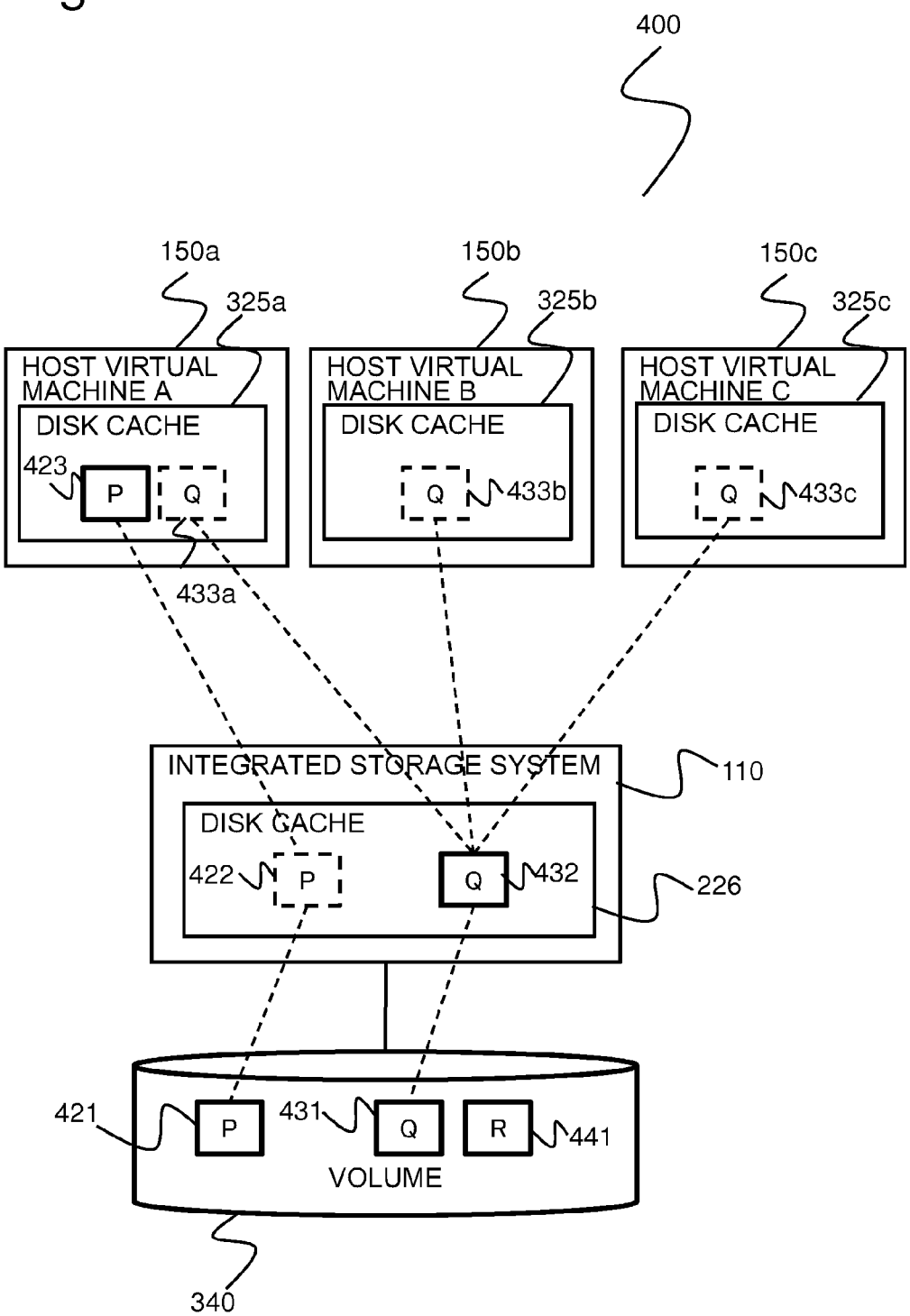
FIG. 4 is a view illustrating one example of mapping of chunks in a volume and caches according to Embodiment 1.

FIG. 4 illustrates an example of a relationship between the respective host computers 150 and the integrated storage system 110, and a mapping 400 of the chunks in the volume and caches. All the host virtual machines 150 can access the respective chunks (P, Q, R) in the volume 340. Further, the integrated storage system 110 can store (cache) the data replica of the respective chunks in the volume 340 in a disk cache 226. When the respective host virtual machines 150 read data of the chunk in the volume 340, if the data of the read target chunk is cached on the disk cache 226 of the integrated storage system 110, the data stored in the disk cache 226 is read and transferred to the host virtual machine 150 without accessing the storage media (240 of FIG. 2) constituting the volume 340.

Furthermore, each host virtual machine 150 can also store (cache) the data replica of the chunk in the virtual volume 340 to the internal disk cache (325a, 325b, 325c), and for example, when the host virtual machine 150a reads the data of the chunk P421, if the data of the chunk P is cached in the disk cache 325a, the host reads the data replica (423) of the chunk P421 cached in the disk cache 325a without accessing the integrated storage system 110. However, the respective host virtual machines 150 cannot refer directly to the data in the disk cache 325 of other host virtual machines 150. For example, when the host virtual machine 325b wishes to read the chunk P421 in the volume 340, even if the data replica of the chunk P421 is stored in the disk cache 325a of the host virtual machine 325a (if P (423) exists in the disk cache 325a), the host virtual machine 325b cannot directly read the data P (423) stored in the disk cache 325a. In such case, the data P (423) is temporarily copied to the disk cache 226 (replica chunk P (422)) of the integrated storage system 110, and then the host virtual machine 325b reads the data copied to the disk cache 226.

FIG. 5 illustrates a configuration example of the cache management table 224. The cache management table 224 is information maintained and managed by the integrated cache management program 223, and stores information related to where in the cache area the chunk in the volume 340 (FIG. 3) is cached. Each row (entry) 561, 562, 563, 564, 565 and so on of the cache management table 224 stores information on the chunk in which the chunk replica is stored (cached) in the disk cache (226, 325) out of the chunks in the respective virtual volumes 340.

The respective entries include the following items: a volume ID 510, a chunk number 520, a master (owner) 530, a memory address 540, and a slave (holder) 550. The integrated cache management program 223 can refer to each entry to recognize that the data of the chunk in the volume specified by the volume ID 510 and the chunk number 520 in each entry is stored (cached) in a memory area (area in the disk cache 226 or 325) specified by the memory address 540. It is necessary that the address information stored in the memory address 540 is capable of uniquely specifying which of the disk caches (the disk cache 226 or any one of disk caches 325) the replica of the data of the chunk is stored, and the location within the cache area where the replica of data exists, wherein according to one preferred embodiment, a physical memory address (address within the memory 220 of the integrated storage system 110) is used as the address information. As described later, the data replica of the chunk specified by the volume ID 510 and the chunk number 520 may be stored in multiple disk caches (325, 226). In that case, all the addresses of the disk caches (226, 325) storing the data replica of the chunk specified by the volume ID 510 and the chunk number 520 are stored in the field of the memory address 540. Row 563 of FIG. 5 illustrates one example thereof. On the other hand, it may be possible that the cache area corresponding to the cache specified by the volume ID 510 and the chunk number 520 is not allocated in the disk cache 226 or 325, and in that case, an invalid value (such as NULL) is stored in the memory address 540.

A master 530 is information showing the computer (host virtual machine 150 or integrated storage system 110) retaining the latest data of the chunk, and the computer determined to be the master has the authority to update the data of the chunk in the cache and to retain data in the cache in a so-called dirty state (state where latest data is not reflected in the storage media). On the other hand, a slave 550 is information showing the computer storing the data replica of the chunk in the disk cache, and information on the computer determined as the master is also registered in the slave 550. Further, the computer (not being a master computer) which is the slave does not have authority to update data.

Only a maximum of one computer can be registered as the master 530 to each chunk. However, multiple computers can be registered as the slave 550. For example, in entry (row) 563 of FIG. 5, "storage" is registered in the column of the master 530, and "A, B, C" is registered in the column of the slave 550. In that case, only the storage (integrated storage system 110) can perform data update of the chunk specified by the volume ID 510 being 1 and the chunk number being 0x5000, and the other computers (host virtual machine 150) can only refer to the data. If the other computer must perform data update, it must request the integrated cache management program 223 to set itself as the master, but this process will be described later.

Next, the statistical information 324 (225) will be described with reference to FIG. 6. The statistical information 324 (225) is information storing the access status of the host virtual machine 150 or the integrated storage system 110 with respect to each chunk within the volume 340, and the information is respectively maintained and managed by each host virtual machine 150. The statistical information 324a records the access status of the host virtual machine 150a to the volume 340, and similarly, the statistical information 324b and 324c each record the access statuses of the host virtual machines 150b and 150c to the volume 340. Each time the host virtual machine 150 or the integrated storage system 110 accesses the respective chunks within the volume 340, the content of the statistical information 324 (225) is updated.

Each statistical information 324 has multiple entries (rows) having items of a volume ID 571, a chunk number 572, a last write time 573, a last read time 574, a write frequency 575, and a read frequency 576. Each entry stores a status of accesses to a chunk specified by the volume ID 571 and the chunk number 572 of the host virtual machine 150, and the last write time 573 and the last read time 574 respectively store the latest time of write or read performed to the chunk (the chunk specified by the volume ID 571 and the chunk number 572) by the host virtual machine 150. The write frequency 575 and the read frequency 576 respectively store information of the frequency (iops) of a write/read request issued by each host virtual machine 150 to the chunk per unit time.

Figure 7:
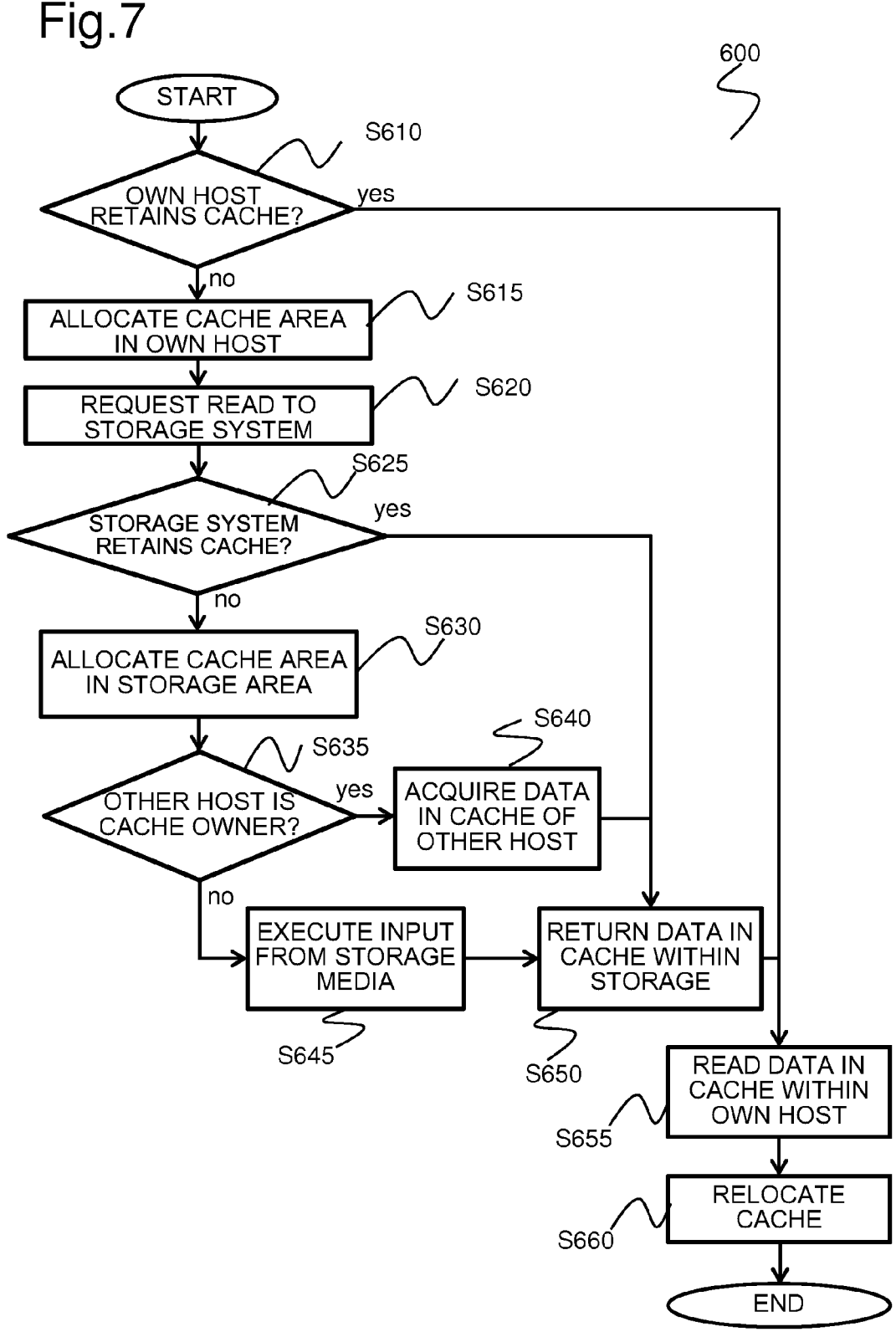
FIG. 7 is a view illustrating a read processing flow of a host computer according to Embodiments 1 and 3.

Next, FIG. 7 illustrates a flow (flow 600) of the processing that the host virtual machine 150 executes to the chunk in the volume 340. The following describes an example of the application program 321a of the host virtual machine 150a reading data from the chunk in the volume 340, but similar processes are performed in other host virtual machines 150.

When the application program 321a issues a read command designating information (volume ID and chunk number) specifying the chunk of the read target to the volume input/output program 322a, the volume input/output program 322a instructs the cache management program 323a to determine whether a data replica of the read target chunk is retained (whether the chunk is cached) in the disk cache 325a of the host virtual machine 150a or not (S610). In this determination, the cache management program 323a inquires the integrated cache management program 223 whether the data replica of the chunk is retained in the disk cache 325a of the host virtual machine 150a, and when the integrated cache management program 223 receives the inquiry, it refers to the cache management table 224 to determine whether the data replica of the chunk is retained in the disk cache 325a within the host virtual machine 150a or not. Actually, it determines whether the information of the host virtual machine 150a being the target of inquiry is registered in the slave 550 in the entry having the designated volume ID 510 and the chunk number 520 within the cache management table 224.

When it is determined that the data replica of the read target chunk is retained in the disk cache 325a of the host virtual machine 150a, the procedure advances to S655. When the data replica of the read target chunk is not retained in the disk cache 325a of the host virtual machine 150a, the cache management program 323a allocates an area for storing the replica chunk in the disk cache 325a of the host virtual machine 150a (S615). The management method such as the allocation or freeing of a cache area is a well known technique, so that the detailed description thereof is omitted, but the cache management program 323a maintains and manages the information for managing the unused area of the disk cache 325a, selects the unused area using the information and uses the area for storing the data replica of the read target chunk. If there is not enough unused area, any of the areas being used in the disk cache 325a (for example, the area having the oldest last accessed time) is changed to an unused area, and uses the area as an area for storing the data replica of the current read target chunk. Simultaneously as allocating the cache area, the cache management program 323a notifies the integrated cache management program 223 the information of the allocated area (information necessary for updating the cache management table, such as the address in the cache, the volume ID and the chunk number of the chunk corresponding to the allocated area), and the integrated cache management program 223 having received the information updates the cache management table 224. The update processing of the cache management table 224 stores a memory address information of the newly allocated disk cache area in the column of the memory address 540 within the entry of the chunk corresponding to the area in the newly allocated disk caches 325 and 226, and registers the information of the host virtual machine 150 or the integrated storage 110 having allocated the disk cache to the slave 550 column of the entry. Thereafter, the volume input/output program 322a issues a chunk data read request to the integrated storage system 110 via the internal communication path with designating information specifying the read target chunk (the volume ID and the chunk number) (S620).

The integrated storage system 110 having received the request to read the chunk data performs the processes of S625 to S650 mainly via the internal input/output reception program 221. The internal input/output reception program 221 inquires the integrated cache management program 223 whether the data replica corresponding to the read target chunk is retained in the disk cache 226 of the integrated storage system 110 (S625). The integrated cache management program 223 having received the inquiry on whether data replica is retained or not determines, similar to the process described with reference to S610, whether an entry having the designated volume ID 510 and the chunk number 520 exists in the cache management table 224, and when such entry exists, whether the information of the integrated storage system 110 is registered in the slave 550 or not. If the information is retained, the data in the disk cache 226 of the integrated storage system 110 should be returned to the host virtual machine 150, so that the procedure advances to S650. If it is not retained, the integrated cache management program 223 allocates an area for storing the replica chunk in the disk cache 226 of the integrated storage system 110 (S630). In S630, similar to S615, the integrated cache management program 223 allocates an area and also updates the content of the cache management table 224.

When an area is allocated, the internal input/output reception program 221 inquires the integrated cache management program 223 whether the host virtual machine 150 which is the master of the read target chunk exists or not (S635). When this inquiry is received, the integrated cache management program 223 refers to the entry where the information related to the read target chunk (chunk specified by the volume ID 510 and the chunk number 520) within the cache management table 224 is registered, and acquires the information of the computer (host virtual machine) registered as the master 530, and returns the same to the internal input/output reception program 221 (it is possible that the chunk data is not cached in other host virtual machines 150, and in that case, a response is returned notifying that there is no master computer). The internal input/output reception program 221 can determine whether a master host virtual machine 150 exists or not by referring to the information of the computer being returned from the integrated cache management program 223.

As a result of determination in S635, when a master host virtual machine 150 exists, the internal input/output reception program 221 requests the master host virtual machine 150 to send a data replica of the read target chunk retained in the disk cache 325 of the master host virtual machine 150, and acquires data from the master host virtual machine 150. The acquired data is stored in the area of the disk cache 226 allocated in S630 (S640). When there is no master host virtual machine 150, that is, if no other host virtual machine 150 has the replica chunk, the internal input/output reception program 221 sends an instruction to the storage media input/output program 222 to read the target chunk data from the storage media 240 constituting the volume 340, and stores the same in the area of the disk cache 226 allocated in S630 (S645).

Thereafter, the internal input/output reception program 221 returns the data stored in the disk cache 226 to the host virtual machine 150a, and the volume input/output program 322a of the host virtual machine 150a stores the data received from the internal input/output reception program 221 in the disk cache 325a allocated in S615 (S650). According to the procedure mentioned above, the data of the target chunk is stored in the disk cache 325 of the host virtual machine 150.

Thereafter, the volume input/output program 322 transfers data to the application program 321 (S655). Finally, the integrated cache management program 223 executes a cache relocation processing illustrated in flow 1000 (S660). Further, it updates the statistical information. According to the above procedure, the reading of the chunk in the volume 340 is completed. The cache relocation processing will be described later, but it is possible to adopt a configuration where the cache relocation processing is performed only during the write processing mentioned later and the cache relocation processing is not necessarily performed during the read processing (S660).

Figure 8:
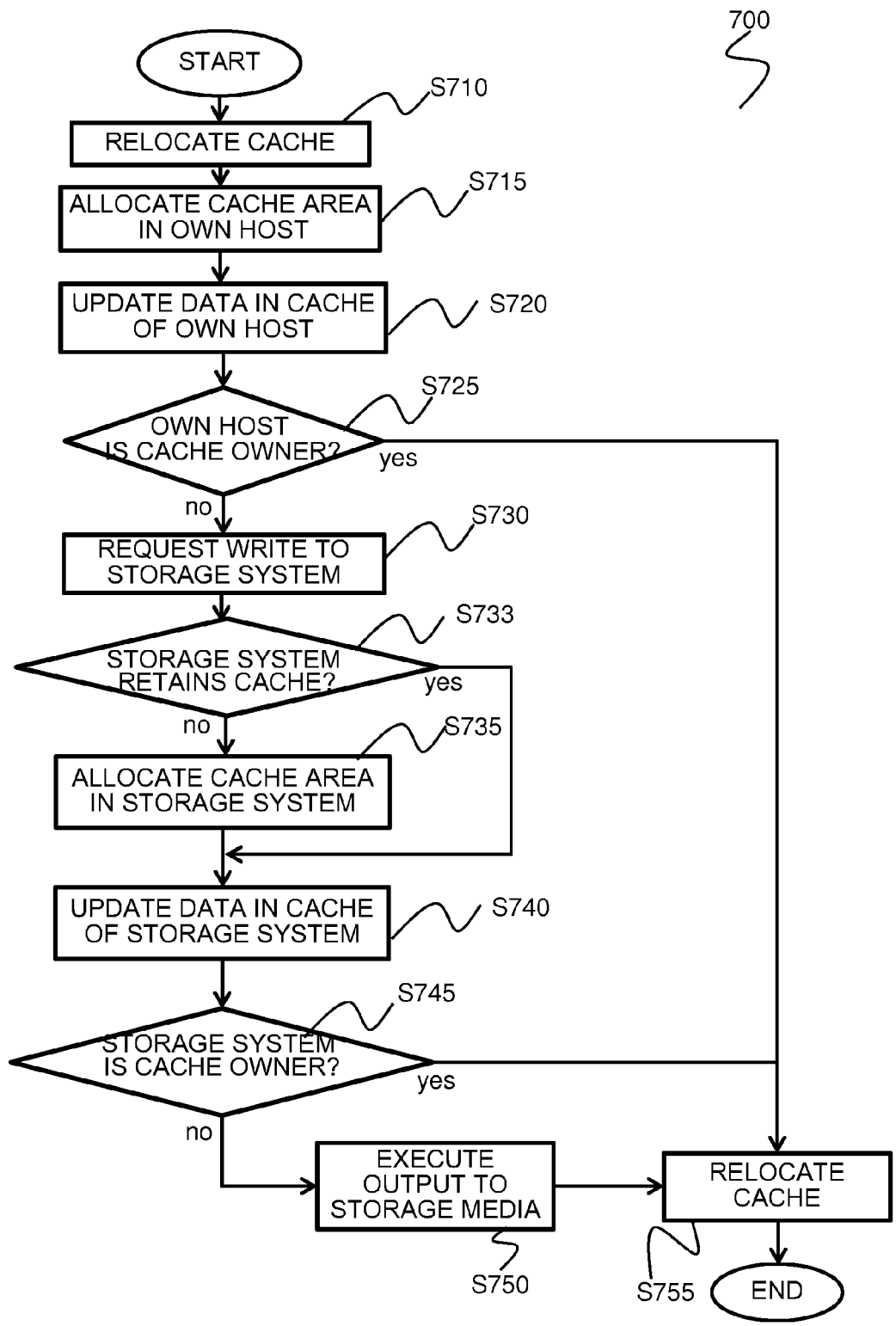
FIG. 8 is a view illustrating a write processing flow of a host computer according to Embodiments 1 and 3.

FIG. 8 illustrates a flow of the chunk write processing 600 to the volume 340 by the host virtual machine 150. In the following process, it is assumed that the disk cache behaves as a write-back cache. That is, it is assumed that the write processing is completed when the write data is written in the disk cache.

When the application program 321 requests writing of the chunk data to the volume input/output program 322, at first, the volume input/output program 322 requests the integrated cache management program 223 to execute a cache relocation processing illustrated in flow 1000 (S710). Next, when there is no storage area of the write target chunk in the disk cache 325, the cache management program 323 allocates an area in the disk cache 325 (S715). The process for allocating this area is similar to S615. Then, the write data is written in the area allocated in S715 (S720). Next, the cache management program 323 inquires the integrated cache management program 223 the information of the computer being the master of the write target chunk (S725). If the host virtual machine 150 performing the write itself is the master, the write processing is completed at this point of time, and cache relocation illustrated in the flow 1000 is performed lastly before the processing is ended (S755). If the host virtual machine 150 performing the write itself is not the master, the volume input/output program 322 issues a data write request to the integrated storage system 110 via the internal communication path with designating the volume ID and the chunk number of the write target chunk (S730). The internal input/output reception program 221 of the integrated storage system 110 having received the write request of the chunk data inquires the integrated cache management program 223 whether a cache area corresponding to the write target chunk is retained in the disk cache 226 of the integrated storage system 110 or not (whether the information of the integrated storage system 110 is registered in the slave 550 of the cache management table 224 or not) (S733), and if there is no area for storing the replica chunk in the disk cache 226, it allocates an area for storing the replica chunk (S735). Then, the internal input/output reception program 221 writes the received write data in the area allocated in S735 (S740). Next, the internal input/output reception program 221 inquires the integrated cache management program 223 whether the master of the target chunk is the integrated storage system 110 itself or not (S745). If the master is not the integrated storage system 110 itself, the storage media input/output program 222 writes the data written in S740 to the storage media 240 constituting the volume 340. At this time, the write processing is completed, and lastly, the cache relocation processing and the update of statistical information shown in flow 1000 is performed, before the processing is ended (S755).

Figure 9:
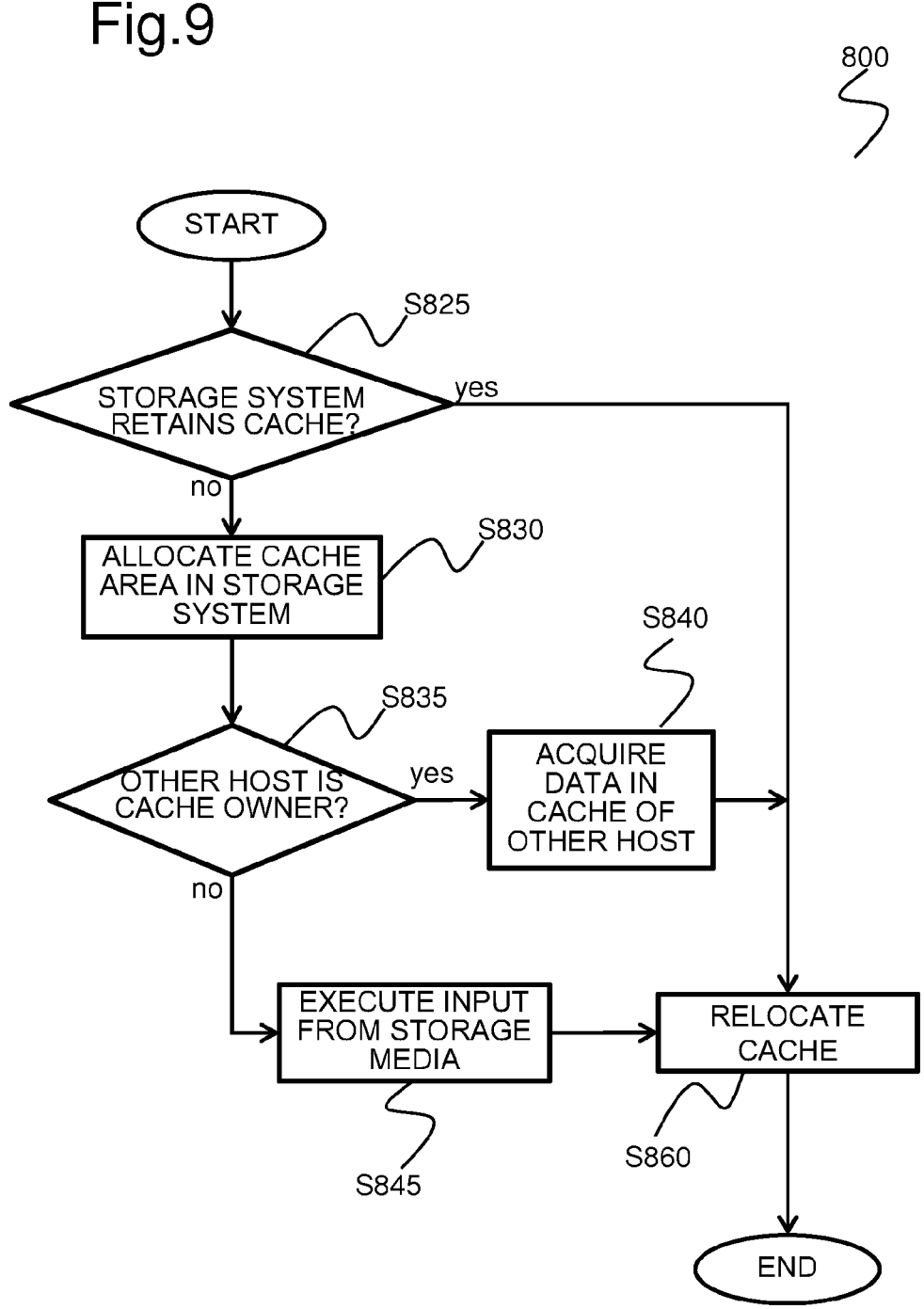
FIG. 9 is a view illustrating a read processing flow of an integrated storage system according to Embodiments 1 and 3.

FIG. 9 illustrates a read processing flow 800 of the chunk in the volume 340 according to the integrated storage system 110. This processing flow 800 is executed when the integrated storage system 110 itself refers to the data in the volume with the aim to realize functions such as storage-media-to-storage-media data copy or verification of data integrity.

The processing flow 800 is a process having a portion of the processes deleted from the processing flow 600, wherein each process is the same as the contents of the processing flow 600. That is, S825 performs the equivalent determination as S625. S830 performs the equivalent process as S630. S835 performs the equivalent determination as S635. S840 executes the equivalent process as S640. S845 performs the equivalent process as S645. S860 performs the equivalent process as S660.

Figure 10:
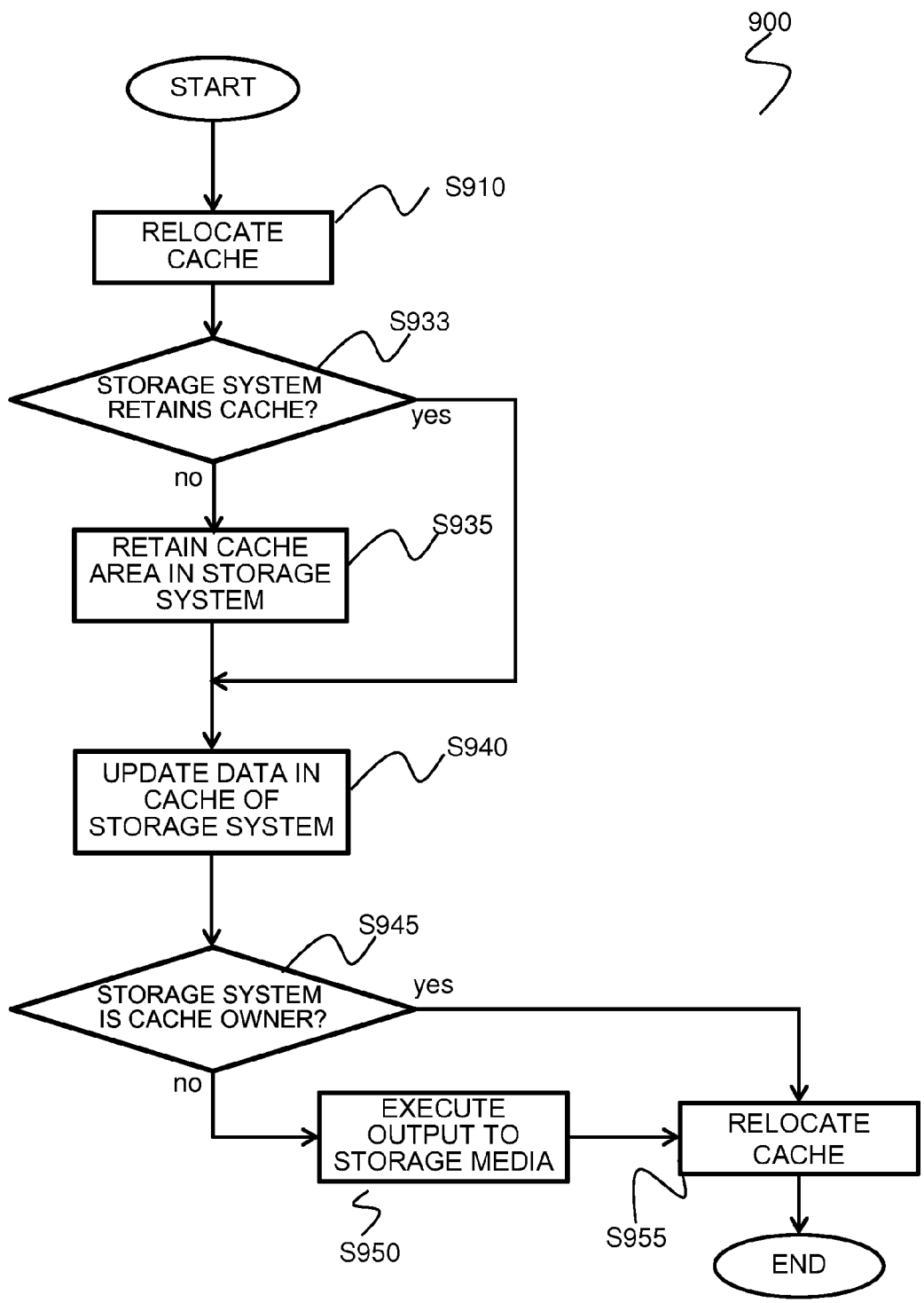
FIG. 10 is a view illustrating a write processing flow of an integrated storage system according to Embodiments 1 and 3.

FIG. 10 illustrates a write processing flow 900 of the chunk in the volume 340 according to the integrated storage system 110. This processing flow 900 is executed when the integrated storage system 110 itself overwrites the data in the volume with the aim to realize functions such as the storage-media-to-storage-media data copy.

The processes performed during the processing flow 900 are a portion of the processes performed during the processing flow 700. That is, S910 performs the equivalent process as S710. S933 performs the equivalent determination as S733, and S935 and S940 respectively perform equivalent processes as S735 and S740. S945 performs the equivalent determination as S745, that is, determines whether the integrated storage system 110 is a master of the data in the write chunk. If the integrated storage system 110 is the master, the procedure advances to S955 without performing any operation, but if the integrated storage system 110 is not the master, data is written to the volume (storage media) in S950. In S955, the cache relocation processing and the update of statistical information is performed similar to S755.

Figure 11:
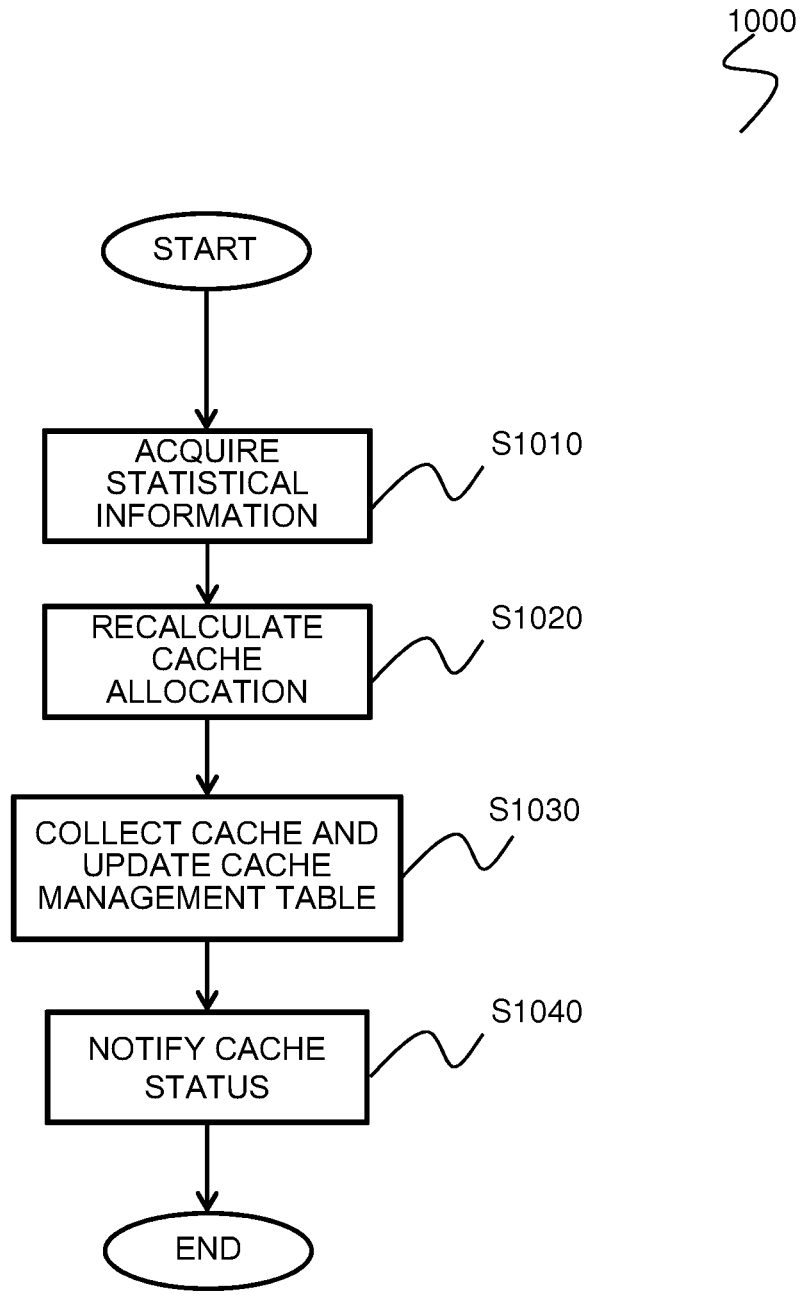
FIG. 11 is a view illustrating a relocation processing flow of a cache.

FIG. 11 illustrates a cache relocation processing flow 1000. Execution of this processing flow 1000 is requested at the first of the write processing, or at the end of the read/write processing (S660, S710, S755, S860, S910 and S955 in the processing flows 600, 700, 800 and 900).

In the processing flow 1000, at first, the integrated cache management program 223 acquires the statistical information 324 in the respective host virtual machines 150 and the statistical information 225 in the integrated storage system 110 (S1010).

Next, the integrated cache management program 223 recalculates the cache allocation based on the acquired statistical information 225 and 324 and the information in the cache management table 224 (S1020). The cache allocation recalculation processing determines the data allocation in the disk cache so as to improve the use efficiency of the areas of the disk caches 226 and 325 and to enhance the execution speed of the application program 321 of the respective host virtual machines, and determines which computer should be the master of the processing target chunk. As a result of the recalculation processing of cache allocation, the computer being the master of the processing target chunk (the host virtual machine 150 or the integrated storage system 110) and the (unnecessary) cache area to be deleted are determined.

The details of the cache allocation recalculation processing will be described. At first, the basic concept of cache allocation according to Embodiment 1 of the present invention will be described with reference to FIG. 4. As mentioned earlier, the state where multiple host virtual machines 150 are respectively caching the data in the specific chunk of the volume deteriorates the efficiency of use of the memory, so that the integrated storage system 110 of the present invention solves the state where the same chunk data in the volume is cached in multiple host virtual machines 150. At that time, the performance of the application programs 321 accessing the volume may differ according to the selection of cache destination of the data, so that the cache destination is selected so as to improve the access performance of the application program 321 as much as possible.

In FIG. 4, when it is determined that only the host virtual machine 150a accesses the chunk P (421), the integrated storage system 110 stores the replica data P (423) of this chunk in the disk cache 325a of the host virtual machine 150a, and deletes the replica chunk P (422) of the integrated storage system 110. In this case, the reference/update processing of the chunk P (421) by the host virtual machine 150a is completed within the host virtual machine 150a and the processes of S620, S730 and thereafter can be omitted, so that the execution speed of the application program 321 within the host virtual machine 150a can be improved. Further, the host virtual machine 150b accessed the chunk P (421), but if it is determined that the host virtual machine 150b has little possibility of accessing the chunk P (421) thereafter and only the host virtual machine 150a possibly accesses the chunk P (421) considering the access statistics of the host virtual machine 150b (there is high possibility that the host virtual machine 150a will access the chunk P (421)), the replica data P (423) of the chunk should be located only in the host virtual machine 150a, so that it is allocated only in the disk cache 325a.

On the other hand, if it is determined that the chunk Q (431) should be accessed by the respective host virtual machines 150a, 150b and 150c, then the replica chunk Q (433a, 433b, 433c) within the host virtual machines should be deleted, leaving the replica chunk Q (432) in the integrated storage system 110. This is because if the replica chunk Q is stored in one of the host virtual machines, as in the example of the chunk P (421), each time a host virtual machine performs input/output of the chunk Q (431), a data acquisition processing by S640 occurs each time and the processing speed is deteriorated. Therefore, regarding the chunk being frequently accessed by the respective host virtual machines 150a, 150b and 150c, the replica of the chunk data should be stored in the disk cache 226 in the integrated storage system 110.

However, when the data update processing (processing flow 700 or 900) is executed, the latest data of the update target chunk is stored in the disk cache (226, 325) of the host virtual machine or the integrated storage system 110 executing the update processing, so that the master computer of the relevant chunk must be the host virtual machine 150 or the integrated storage system 110 executing the update processing. Therefore, according to the cache relocation processing of Embodiment 1 of the present invention, the host virtual machine 150 or the integrated storage system 110 executing the update processing is set as the master forcibly immediately before executing the data update processing (processing flow 700 or 900), and the replica chunk retained by other host virtual machines 150 is deleted (however, there is another choice of not having the chunk with a small possibility of being accessed thereafter cached in neither the host virtual machines 150 nor the integrated storage system 110, that is, of not having a master computer).

According to the integrated storage system 110 in Embodiment 1 of the present invention, recalculation of cache allocation is performed based on the concept described above. However, the cache relocation processing 1000 is a process executed in various scenes, such as the last of the read processing of FIG. 7 (S660), or the start (S710) or end (S755) of the write processing of FIG. 8, but depending on the scene of execution, the content of the cache allocation recalculation processing may differ. Specifically, the processing differs respectively based on whether it is called by S910 of FIG. 10, whether it is called by S710 of FIG. 8, or whether it is called by the subsequent processes (S660 of FIG. 7, S755 of FIG. 8, S860 of FIG. 9, and S955 of FIG. 10). The following description describes the respective cases.

When it is called by S910 of FIG. 10, that is, if it is called by the cache relocation processing performed at the start of the write processing to the chunk in the volume 340 by the integrated storage system 110, it is determined whether the integrated storage system 110 should be set as master or not (when the integrated storage system 110 is not set as the master, the cache area for the write target chunk in the disk cache 226 is deleted, or no other host virtual machines 150 are set as the master). The integrated cache management program 223 refers to the statistical information 225 and determines whether there is a possibility that the access target chunk is accessed by the integrated storage system 110 in the future. As an example, it is determined whether the access frequency (575, 576) to the access target chunk by the integrated storage system 110 is smaller than a given value (first threshold value), and whether the difference between a current time and a last accessed time (573, 574) is equal to or greater than a given time (second threshold). If the access frequency (575, 576) is smaller than a given value, and the difference between the current time and the last accessed time (573, 574) is equal to or greater than a given time, it is assumed that the possibility that the target chunk is re-accessed is small (the effect of caching the data is small), so that no master is set (the areas where the target chunk data is cached are all deleted). If not, it is determined that the integrated storage system 110 is the master, and that the target chunk data replicas in all host virtual machines 150 are deleted. This determination method is a mere example, and other possible examples include determining using only the access frequency, determining using the difference between the current time and the last accessed time, using other information for determination, and so on.

Next, we will describe the processing of the case where the process is called by S710 of FIG. 8. In this case, the processing of determining either the host virtual machine 150 or the integrated storage system 110 performing the chunk write processing as the master is performed. Hereafter, an example is illustrated where the host virtual machine 150a starts a chunk write processing to the volume 340, and in S710 of the processing, the cache relocation processing 1000 is called.

The integrated cache management program 223 refers to the statistical information 225 and the statistical information 324 of the host virtual machine 150, and determines whether the access target chunk is possibly accessed by the integrated storage system 110 or the host virtual machine 150a in the future. One example of the determination method determines whether the access frequency (575, 576) to the target chunk by the host virtual machines 150b and 150c other than the host virtual machine 150a is smaller than a given value, and that the difference between the current time and the last accessed time (573, 574) is equal to or greater than a given time. If the access frequency (575, 576) is smaller than a given value and the difference between the current time and the last accessed time (573, 574) is equal to or greater than a given time, it is assumed that the host virtual machines other than the host virtual machine 150a has little possibility of accessing the target chunk in the future. Therefore, it is determined that the host virtual machine 150a should be set as the master. The replica of the target chunk data in other disk caches (325, 226) are determined to be deleted. If the access frequency (575, 576) is equal to or greater than a given value, or if the difference between the current time and the last accessed time (573, 574) is smaller than a given time, it is assumed that the possibility of the host virtual machines 150 other than the host virtual machine 150a accessing the target chunk in the future is high. Therefore, it is determined that the integrated storage system 110 is the master, and that the replica of the target chunk data of all the host virtual machines 150 should be deleted.

Lastly, an example is described where the cache relocation processing is called by S660 of FIG. 7, S755 of FIG. 9, S860 of FIG. 10, and S955 of FIG. 11. In that case, the integrated cache management program 223 refers to the statistical information 225 and the statistical information 324 of the host virtual machine 150a, and determines (more precisely, estimates) whether only a specific virtual machine is accessing the target chunk, or multiple virtual machines are accessing the target chunk. As an example of the determination method, the host virtual machine 150 or the integrated storage 110 (hereinafter abbreviated as "computer" in the present paragraph) having the highest access frequency (575, 576) and the second highest access frequency to the target chunk out of all the host virtual machines 150 and the integrated storage 110 are selected. Then, it is determined whether the difference between the access frequency of the computer having the highest access frequency to the target chunk and the access frequency of the computer having the second highest access frequency thereto is equal to or greater than a given value, and if the difference is equal to or greater than a given value, it is determined that only the computer having the highest access frequency to the target chunk is accessing the target chunk, and this computer is determined to be the master. The process determines that the data replica of the target chunk cached in other computers should be deleted. If the difference of access frequencies is smaller than a given value, it is determined that multiple computers are accessing the target chunk, and determines the integrated storage 110 as the master. It is determined that the data replicas of the target chunk cached in other computers are to be deleted. The above-described process is the content of the computation of cache relocation.

In response to receiving the result of the recalculation of cache allocation of S1020, the integrated cache management program 223 collects unnecessary cache areas and updates the cache management table 224 (S1030). Specifically, at first, as a result of the recalculation of cache allocation, if the master computer (the host virtual machine 150 or the integrated storage system 110) is to be changed and the master computer allocates a cache area for the access target chunk in its own disk cache (226, 325), the integrated cache management program 223 instructs the cache management program 323 or the storage media input/output program 222 to have the data in the cache area written to the storage media of the integrated storage system 110. Next, the information of the cache area to be deleted (corresponding to the information of the memory address 540 of FIG. 5) is deleted from the cache management table 224, and the information of the computer registered in the master 530 is updated to the content determined in S1020 (if it is determined that there is no master in S1020, an invalid value is set as the content of the master 530). Finally, of the contents in the cache management table 224, the information of the entry updated in S1030 is notified to the cache management program 323 of the respective host virtual machines 150 (S1040). When the cache management program 323 of each host virtual machine 150 receives this information, it changes the management information of an unused area so that the area storing data that is no longer necessary to be cached should be managed as an unused area. Thereby, the cache relocation processing is ended.

The configuration and content of processing of the integrated storage system 110 according to Embodiment 1 of the present invention have been described. Next, we will describe the effects of the present invention with reference to FIG. 4. According to the integrated storage system 110 in Embodiment 1 of the present invention, when only the host virtual machine 150a refers to the chunk P (421), the data replica of chunk P is retained only in the disk cache 325a of the host virtual machine 150a, and if data replicas of the chunk P exist in other disk caches (325b, 325c, 226), these replicas of the data are deleted. When the respective host virtual machines 150a, 150b and 150c all refer to the chunk Q (431), the data replica (432) of chunk Q is retained only in the disk cache 226, and the data in other disk caches are deleted.

On the other hand, in a computer system not adopting the present cache relocation processing, when a read request to the chunk P (421) in the volume 340 is issued, the data replica (422) of chunk P is stored in the disk cache 226 of the storage system 110. Further, data replica (422) of the chunk P is transferred from the disk cache 226 in the integrated storage system 110 to the host virtual machine 325a, and data replica of the chunk P is also stored in the disk cache 325a of the host virtual machine 150a (that is, the replica of chunk P exists in a duplicated manner in disk caches 226 and 325a). Further, when the respective host virtual machines 150a, 150b and 150c all read the chunk Q (431), the replica of chunk Q (432) is stored in the disk cache 226 of the integrated storage system 110, and the replicas of chunk Q (433a, 433b, 433c) are also stored in the disk caches 325a, 325b and 326c in the respective host virtual machines 150a, 150b and 150c, so that a large number of data replicas of the same chunk remain stored in the disk caches.

In the integrated storage system 110 according to Embodiment 1 of the present invention, it becomes possible to prevent the replica data of the same chunk within the volume from being stored in multiple host virtual machines according to the above process, and the limited disk cache can be utilized efficiently. Further, the location of the chunk data replica in the disk cache can be determined according to the status of access to the chunk from the respective host virtual machines 150, so that the execution speed of the application program 321 can be improved.

Modified Example

Figure 12:
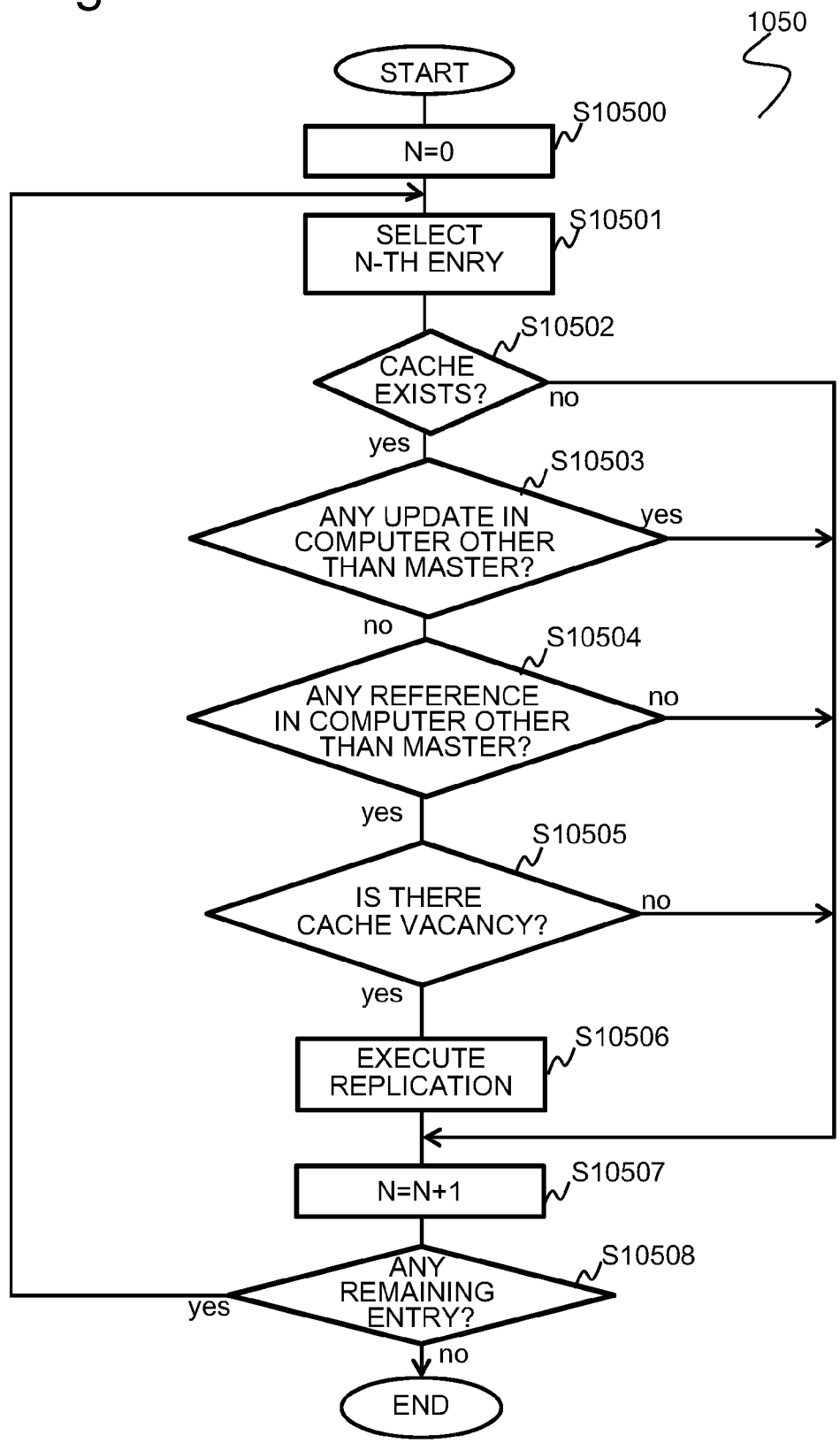
FIG. 12 is a view showing a flow of a replication destination determination processing.

According to the cache recalculation processing flow 1000, the replica of each chunk is stored in a single disk cache, but if there is additional room in the disk cache area, a modified example devising the data allocation system for improving the execution speed of the application program 321 and the like can be considered. A cache replication processing 1050 is described with reference to FIG. 12. The integrated cache management program 223 executes the present processing independently from the cache relocation processing 1000 described above, either periodically (once in a few hours) or when instructed from the user.

In the cache replication processing, a process is performed for determining whether to create a replica of the cached data for all the chunks registered in the cache management table 224. In S10500, a counter N is prepared and N is initialized (set to 0). Next, in S10501, the N-th entry of the cache management table 224 is referred to, and the location information (the volume ID 510 and the chunk number 520) of the chunk registered in the entry, the information of the master of the chunk (the master 530) and the memory address 540 are acquired.

In S10502, it is determined whether the chunk (the chunk specified by the volume ID 510 and the chunk number 520) registered in the selected entry is cached or not. Specifically, it is determined whether a valid value is stored in the memory address 540 or not, wherein if it is determined that the data is cached, the procedure advances to S10503, and if it is determined that the data is not cached, the procedure advances to S10507.

In S10503, the procedure refers to the statistical information 324, and determines whether there is an update of the chunk in all the host virtual machines 150 other than the master. One example of such determination method determines whether the write frequency 575 is 0 or not (or it is possible to determine whether the last write time is earlier to the current time by a given time or greater). If it is determined that there is update in any one of the host virtual machines 150, the procedure advances to S10507, and the chunk is not replicated. If it is determined that there is no update in any of the host virtual machines 150, the procedure advances to S10504.

The processes of S10504 to S10506 are executed for each host virtual machine 150 excluding the master. In S10504, the procedure refers to the statistical information 324, and it is determined whether the relevant chunk is referred to (whether read access is performed) in the host virtual machines 150 excluding the master. As one example of the determination method, it is determined whether a read frequency 575 is equal to or greater than a given value or not (or whether the difference between the current time and the last read time is within a given period of time or not). If it is determined that the relevant chunk is referred to in any of the host virtual machines 150, the procedure advances to S10505, and if not, it advances to S10507.

In S10505, it is determined whether the host virtual machines 150 other than the master have an unused area in the disk cache 325 capable of storing the replica of the chunk data. Specifically, the integrated cache management program 223 inquires the cache management program 323 of the host virtual machines 150 other than the master to determine whether the unused area size of the disk cache 325 is equal to or greater than a given value or not. If it is determined that there is an unused area, the procedure advances to S10506, and if not, the procedure advances to S10507.

In S10506, a process for creating a replica of the chunk data in the disk cache 325 of the host virtual machine 150 determined as having an unused area in the disk cache 325 as a result of the determination performed in S10505 is performed. Specifically, the integrated cache management program 223 instructs the cache management program 323 of the master host virtual machine 150, and copies the chunk replica in the disk cache 325 of the master host virtual machine 150 to the disk cache 226 of the integrated storage 110. Thereafter, the data is copied from the disk cache 226 to the disk caches 325 of the respective host virtual machines 150. Then, the content of the cache management table 224 is updated. If the master of the chunk being the processing target is the integrated storage system 110, the data is copied from the disk cache of the integrated storage system 110 to the disk caches 325 of the respective host virtual machines 150.

In S10507, counter N is incremented, and the procedure is advanced to S10508. In S10508, whether processing has been performed to all entries in the cache management table 224 is determined, and if there is still a yet-to-be-processed entry, the procedure returns to S10502. When all the entries are processed, the processing is ended.

By executing this replication destination determination processing, taking the chunk Q (431) of FIG. 4 as an example, when there is an unused area in the disk cache areas of the respective host virtual machines 150a, 150b and 150c, and the chunk Q (431) is only referred to and not updated, the replica of chunk Q (433a, 433b, 433c) will be retained in all the disk caches 325 of the respective host virtual machines 150a, 150b and 150c. In that case, the reference processing of the chunk Q (431) in the respective host virtual machines 150 will be completed within each host virtual machine 150 and the processes of S620 and thereafter can be omitted, so that the execution speed of the application program 321 in the respective host virtual machines 150a, 150b and 150c can be improved.

Embodiment 2

Next, a computer system according to Embodiment 2 of the present invention will be described. The configuration of the integrated storage system 110 according to the present invention and the configuration of the computer system 100 to which the integrated storage system 110 of the present embodiment is applied are similar to the one in Embodiment 1. Only the differences with the integrated storage system 110 of Embodiment 1 will be described in the following description.

The virtual machine program 227 that the integrated storage system 110 has performs mapping of the memory area for virtual machine 228 and the memory 220. Now, when a memory mapping technique via paging or segment method is adopted, it becomes possible to refer to the same contents from multiple virtual machines having different memory spaces for the respective areas of the memory area for virtual machine 228 and the memory 220. At that time, it becomes possible to map the memory areas of multiple virtual machines to the same area in the memory 220, and to adopt a configuration where the data in the memory is shared.

Figure 13:
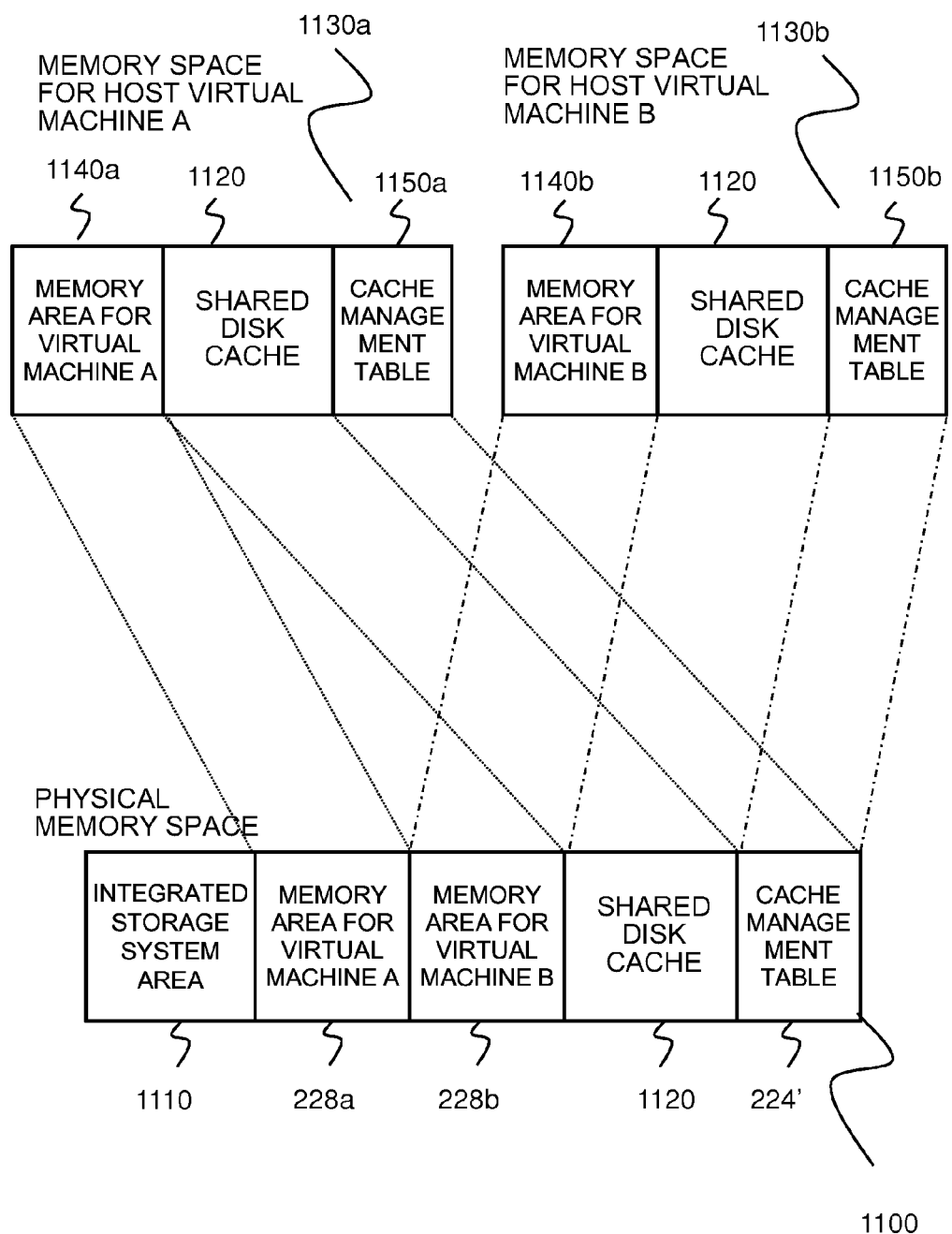
FIG. 13 is a view showing a mapping of a virtual memory space and a physical memory space of a virtual machine according to Embodiment 2.

FIG. 13 illustrates an example of mapping a physical memory space 1100 in the memory 220 of the integrated storage system 110, and memory spaces 1130a and 1130b of the host virtual machine.

An integrated storage system area 1110 within the physical memory space 1100 includes contents only referred to by the integrated storage system 110 of the memory 220. For example, a cache memory area corresponds to this area when the integrated storage system 110 forms a volume that differs from the volume used by the host virtual machine 150, and provides a volume access service to the client 10 independently from the host virtual machine 150. Further, the storage areas of the internal input/output reception program 221 and the integrated cache management program 223 are also included in the integrated storage system area 1110. Each of the memory areas for virtual machines 228a and 228b are mapped to areas 1140a and 1140b within the memory spaces 1130a and 1130b of the host virtual machine. Further, the cache management table 224 is mapped to areas 1150a and 1150b within the memory spaces 1130a and 1130b of the host virtual machine.

In Embodiment 1, the integrated storage system 110 and the respective host virtual machines 150 have retained disk caches 226 and 325, respectively, but the aforementioned mapping of memory areas enables a single shared disk cache 1120 to be shared by the integrated storage system 110 and the respective host virtual machines 150. Based on this mapping, the respective host virtual machines 150 can refer to the shared disk cache area 1120 mapped to the internal memory space 1130 to thereby refer to the replica of chunk data stored in the shared disk cache area 1120 by other host virtual machines 150 via the memory.

Figure 14:
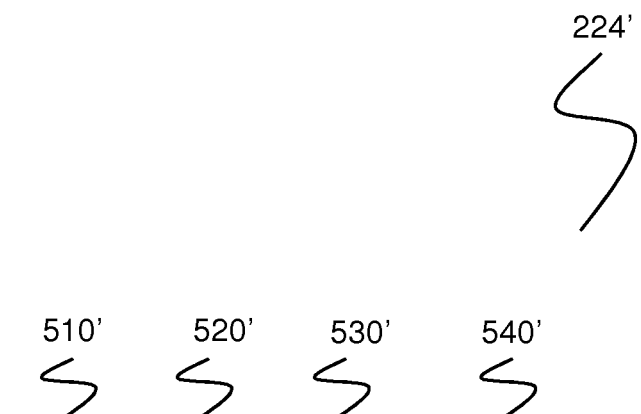
FIG. 14 is a view illustrating an example of a cache management table according to Embodiment 2.

Next, a cache management table 224' managed by the integrated storage system 110 according to Embodiment 2 will be described with reference to FIG. 14. The cache management table 224' according to Embodiment 2 is a table where items of the master 530 and the slave 550 are deleted from the cache management table 224 of Embodiment 1, and a new item of cache necessity 540' is added thereto. The cache necessity 540' column is an item showing whether the data should be cached or not, wherein value 1 stored in the column of cache necessity 540' means that the data of the chunk corresponding to that entry should be cached, and value 0 stored therein means that the chunk corresponding to that entry should not be cached. The actual method of use will be described later.

Further according to the cache management table 224 of Embodiment 1, as shown in row 563 of FIG. 5, an entry exists where multiple memory addresses are registered in the column of the memory address 540, but in the case of the integrated storage system 110 of Embodiment 2, multiple addresses will not be registered in the column of the memory address 540. This is because in Embodiment 2, the disk cache area is shared among multiple host virtual machines 150 and the integrated storage 110, so that the data replica of the chunk will not exist in multiple locations of the disk cache.

Now, the read or write processing of the chunk in the volume 340 will be described with reference to FIGS. 15 through 18. These processes are similar to the processes described in Embodiment 1, but since the cache is a shared cache, there is no process of deleting duplicated cache data as in the cache relocation processing described in Embodiment 1. The read or write processing according to Embodiment 2 mainly differs from the processing performed in Embodiment 1 in that a cache necessity determination processing is performed instead of the cache relocation processing.

Before describing the flow of the read or write processing, we will describe the cache necessity determination processing. The cache necessity determination processing determines whether the access (read or write) target chunk should be cached or not. Various methods can be used for determining whether caching of the access target chunk is necessary or not. As an example, in the protocols such as NFS and SCSI, caching of write data is not allowed, and a command capable of writing data in a final storage media is defined, so that a method can use the arriving of the command to the integrated storage system 110 for determining whether cache is required. Specifically, when a command as the one described above is received, value 0 is stored in the column of the cache necessity 540' in the entry corresponding to the access target chunk in the cache management table 224', and the cache area is deleted (the value of the memory address 530' is set to an invalid value). According to another example, the accumulated number of occurrence of these commands is counted as performance information (statistical information), wherein if the accumulated number of commands exceeds a given threshold, a value 0 is stored in the column of the cache necessity 540' within the entry corresponding to the access target chunk of the cache management table 224', and the cache area is deleted (the value of the memory address 530' is set to an invalid value).

Another possible embodiment can adopt an interval of accesses to the chunk for determining whether caching is required or not. In that case, the integrated cache management program 223 refers to the statistical information 225 and the statistical information 324 of the host virtual machine 150, acquires a last accessed time (573, 574) of the access target chunk by the respective host virtual machines 150 and the integrated storage system 110, and uses the same to compute a minimum value of the difference between the current time and the last accessed time (573, 574) of the access target chunk. If this minimum value is equal to or greater than a given value, it is determined that the access target chunk has not been accessed frequently in the past so that it is assumed that the possibility of the chunk being accessed in the future is small, so that value 0 is stored in the column of the cache necessity 540' within the entry corresponding to the access target chunk in the cache management table 224', and deletes the cache area (sets the value of the memory address 530' to invalid). When the minimum value is smaller than a given value, then value 1 is stored in the cache necessity 540'.

Figure 15:
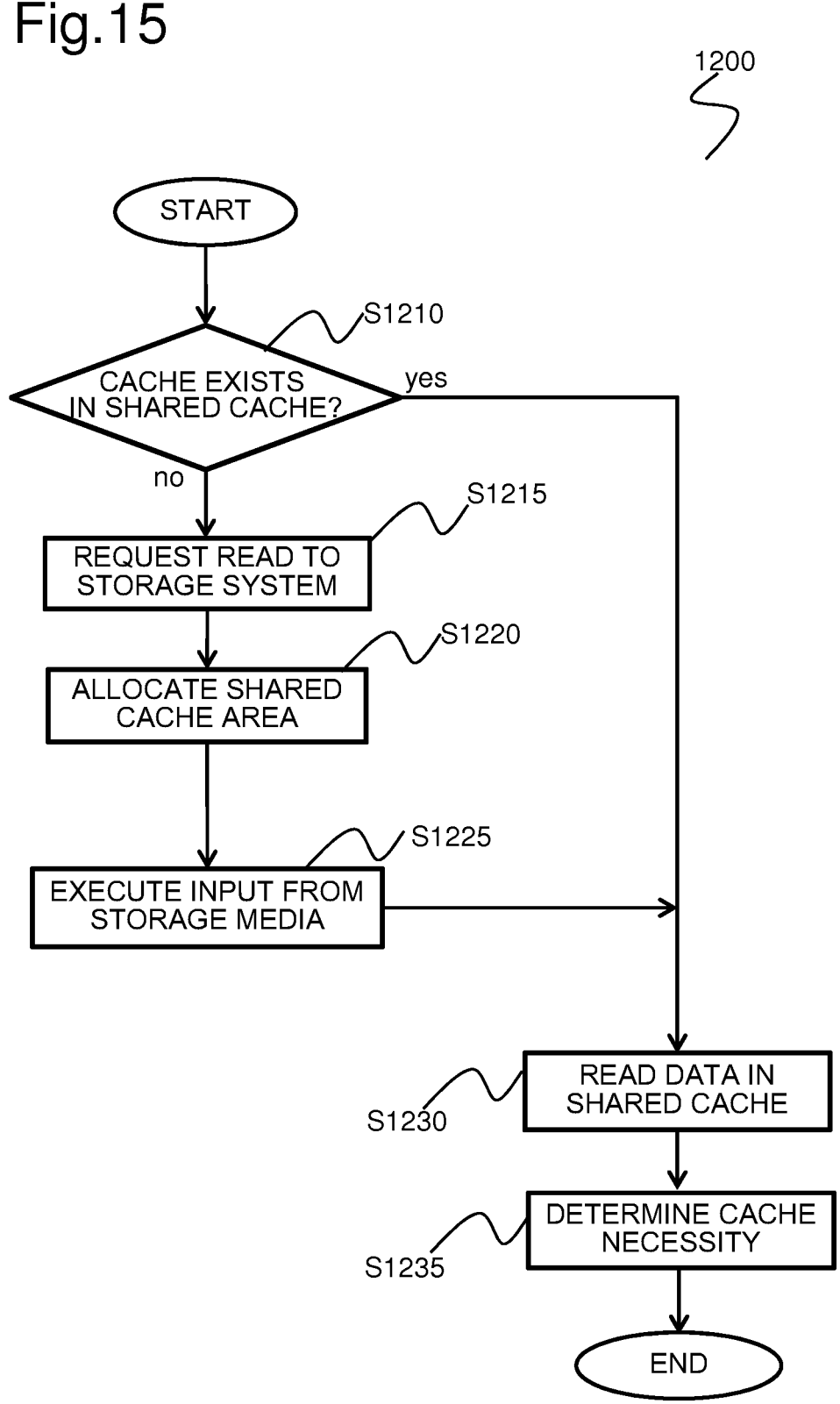
FIG. 15 is a view illustrating a read processing flow of a host virtual machine according to Embodiment 2.

Next, a read processing flow 1200 that the host virtual machine 150 performs with respect to the chunk in the volume 340 will be described with reference to FIG. 15. When the application program 321 requests chunk data to the volume input/output program 322, the volume input/output program 322 causes the cache management program 323 to determine whether the replica chunk of the read target chunk is retained in the shared disk cache 1120 or not (S1210). At this time, the determination method can be an inquiry sent from the cache management program 323 to the integrated cache management program 223, or the cache management program 323 directly referring to the cache management table 1150 mapped to the memory space 1130 of the host virtual machine. When it is determined that replica chunk is retained in S1210, then the procedure advances to S1230 to refer to that data. If replica chunk is not retained, the volume input/output program 322 issues a read request to the integrated storage system 110 via the internal communication path to read the chunk data in the volume (S1215). The internal input/output reception program 221 of the integrated storage system 110 having received the read request of the chunk data requires the integrated cache management program 223 to allocate an area for locating the replica chunk within the shared disk cache 1120 (S1220). When the area is allocated, the internal input/output reception program 221 orders the storage media input/output program 222 to store the data of the target chunk in the storage media 240 constituting the volume 340 into the area in the shared disk cache 1120 allocated in S1220. When the replica data of the read target chunk is stored in the shared disk cache 1120, the internal input/output reception program 221 notifies the volume input/output program 322 in the host virtual machine 150 that the preparation for reading has been completed (S1225). In S1230, the volume input/output program 322 notifies the application program 321 that the read preparation has been completed and the address in the shared disk cache 1120 storing the replica data of the read target data. Thereafter, the application program 321 reads data from the address in the shared disk cache 1120 notified from the volume input/output program 322. Finally, the integrated cache management program 223 can execute the cache necessity determination processing described above (S1235). The chunk reading process in the volume 340 is completed by the above procedure.

Figure 16:
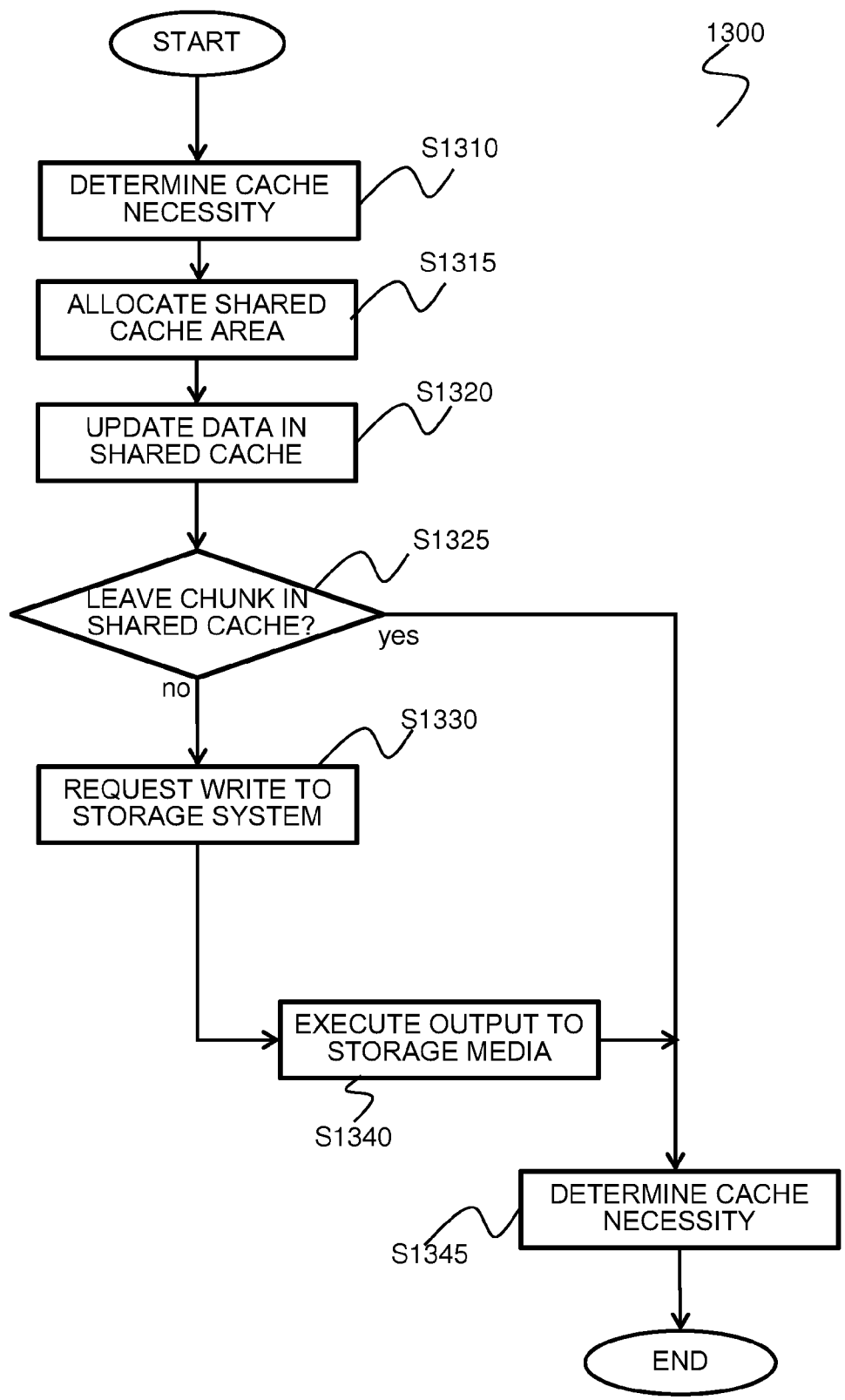
FIG. 16 is a view showing a write processing flow of a host virtual machine according to Embodiment 2.

FIG. 16 illustrates a write processing flow 1300 of a chunk to the volume 340 by the host virtual machine 150. In the following process, it is assumed that the disk cache behaves as a write-back cache. That is, the write processing of the write data is assumed to be completed when the data is written in the disk cache.

When the application program 321 requests the volume input/output program 322 to write the chunk data, at first, the volume input/output program 322 requests the integrated cache management program 223 to execute a cache necessity determination (S1310). Next, the cache management program 323 allocates an area (S1315) when there is no storage area allocated for the write target chunk in the shared disk cache 1120. After the area is allocated, the volume input/output program 322 writes the data to be written in the area allocated in S1315 (S1320).

Thereafter, the cache management program 323 determines whether the write target chunk should be cached or not (S1325). Specifically, it is determined whether value 1 is stored in the column of the cache necessity 540' of the cache management table 224' or not. If value 1 is stored therein, it means that data should be cached, so that the write processing is completed at this time, and the cache necessity determination is performed to finally complete the process (S1345). If value 0 is stored therein, the volume input/output program 322 issues a write request of the chunk data in the volume to the integrated storage system 110 via the internal communication path to the area having performed the write processing (S1330), and the storage media input/output program 222 writes the data written in the shared cache in S1320 to the storage media 240 constituting the volume 340 (S1340). Finally, the cache necessity determination is performed and the procedure is ended (S1345).

Figure 17:
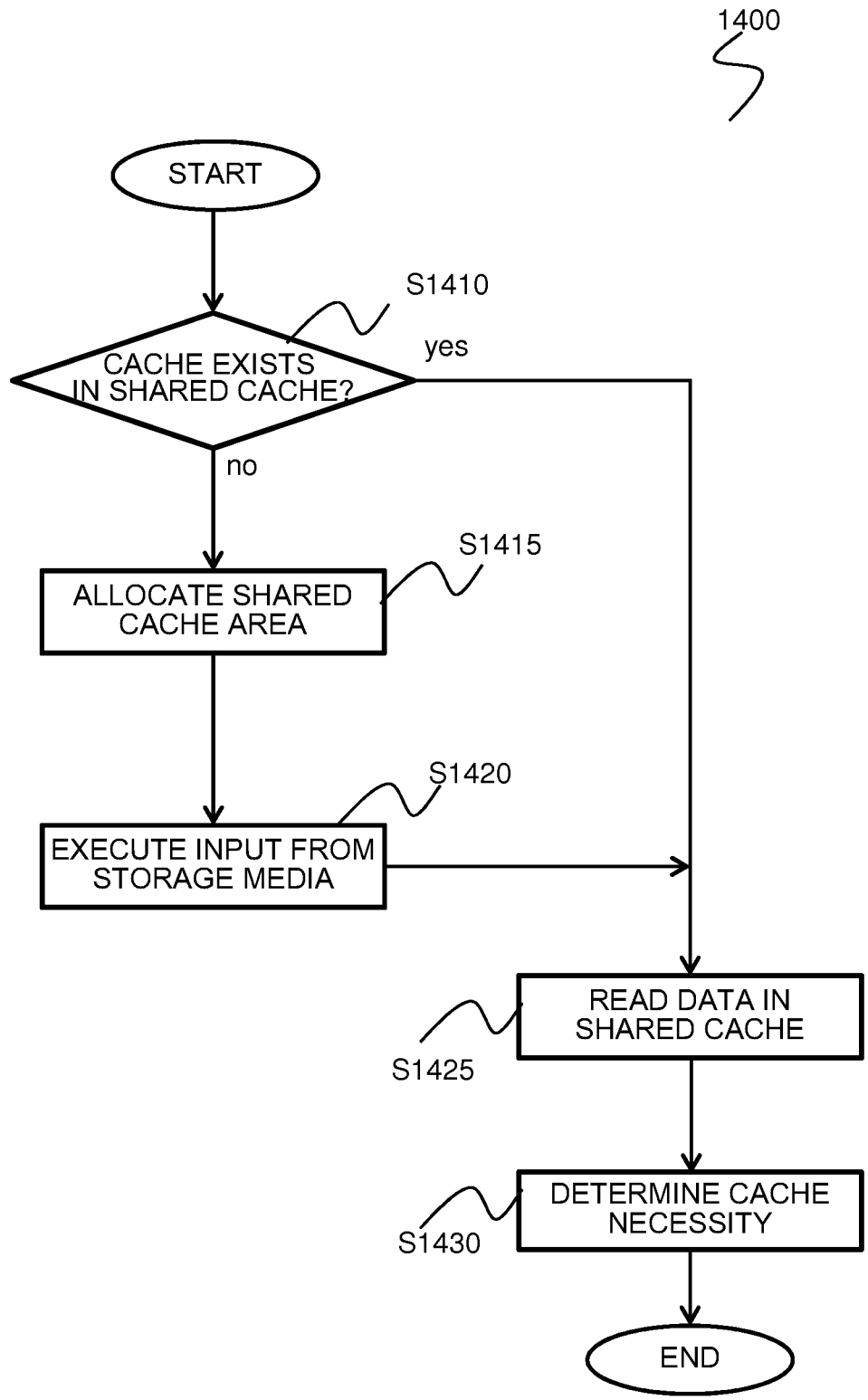
FIG. 17 is a view showing a read processing flow of an integrated storage system according to Embodiment 2.

FIG. 17 illustrates a read processing flow 1400 to the chunk in the volume 340 by the integrated storage system 110. This processing flow 1400 is executed when the integrated storage system 110 itself refers to the data in the volume with the aim to realize functions such as storage-media-to-storage-media data copy or data integrity verification.

The processing flow 1400 extracts a portion of the processing flow 1200. S1410 performs the equivalent determination as S1210. S1415 executes the equivalent process as S1220. S1420 executes the equivalent process as S1225. S1425 executes the equivalent process as S1230. S1430 executes the equivalent process as S1235.

Figure 18:
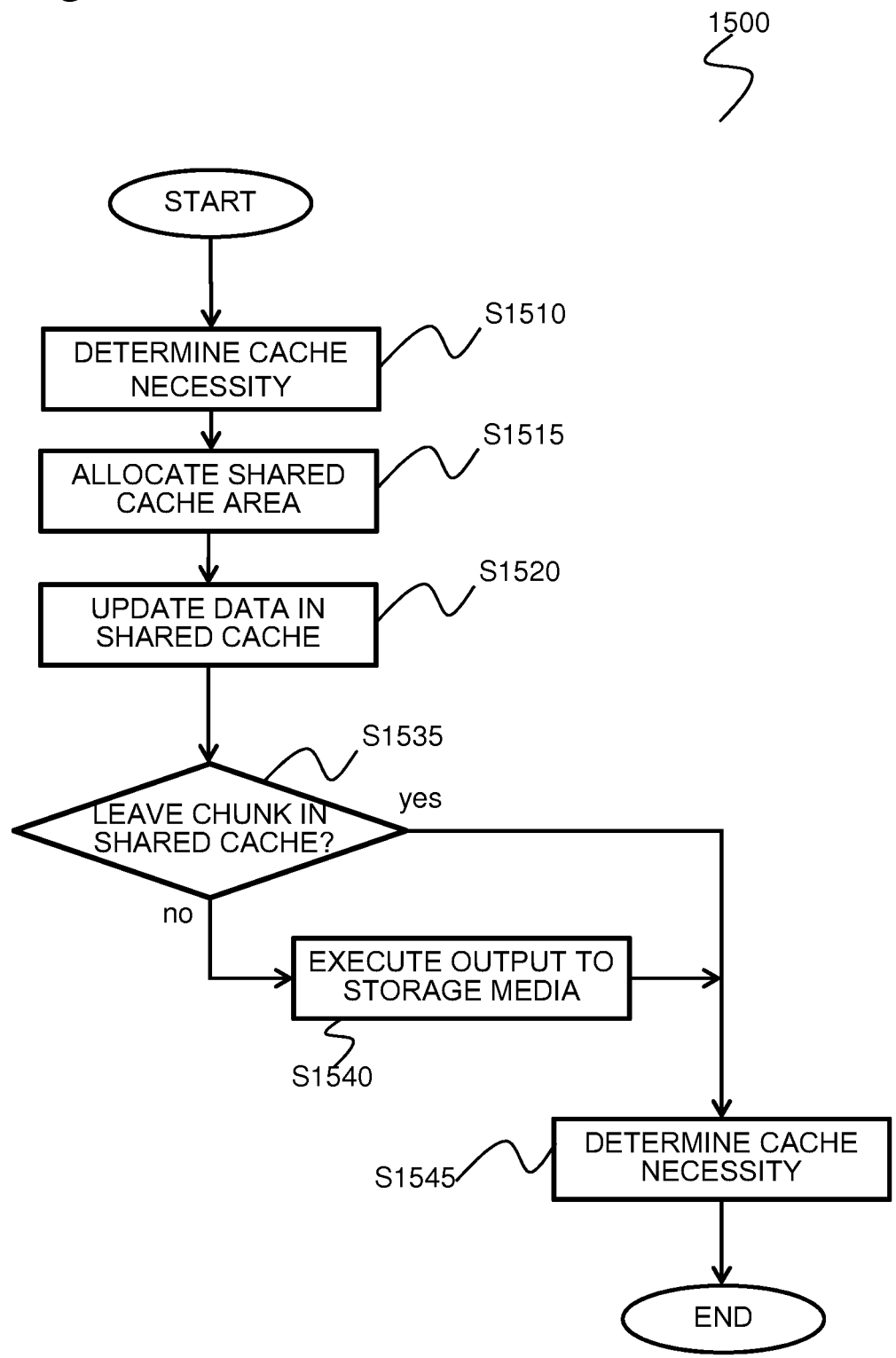
FIG. 18 is a view showing a write processing flow of an integrated storage system according to Embodiment 2.

FIG. 18 illustrates a write processing flow 1500 to the chunk in the volume 340 according to the integrated storage system 110. This processing flow 1500 is executed when the integrated storage system 110 itself overwrites the data in the volume with the aim to realize a function such as the storage-media-to-storage-media data copy.

The processing flow 1500 extracts a portion of the processing flow 1300. That is, S1510 executes the equivalent process as S1310. S1515 executes the equivalent process as S1315. S1520 executes the equivalent process as S1320. S1535 executes the equivalent process as S1335. S1540 executes the equivalent process as S1340. S1545 executes the equivalent determination as S1345.

By adopting the present invention, it becomes possible to prevent replica chunks storing the same contents of the chunk in the volume to be retained in multiple host virtual machines, similar to Embodiment 1, so that the limited disk cache areas can be utilized efficiently and the execution speed of the application program 321 can be improved. Further according to Embodiment 2, the respective host virtual machines 150 can refer to the data directly without issuing an input/output request to the integrated storage system 110, so that the omitted input/output request enables to shorten the processing time of the application program 321.

Embodiment 3

Figure 19:
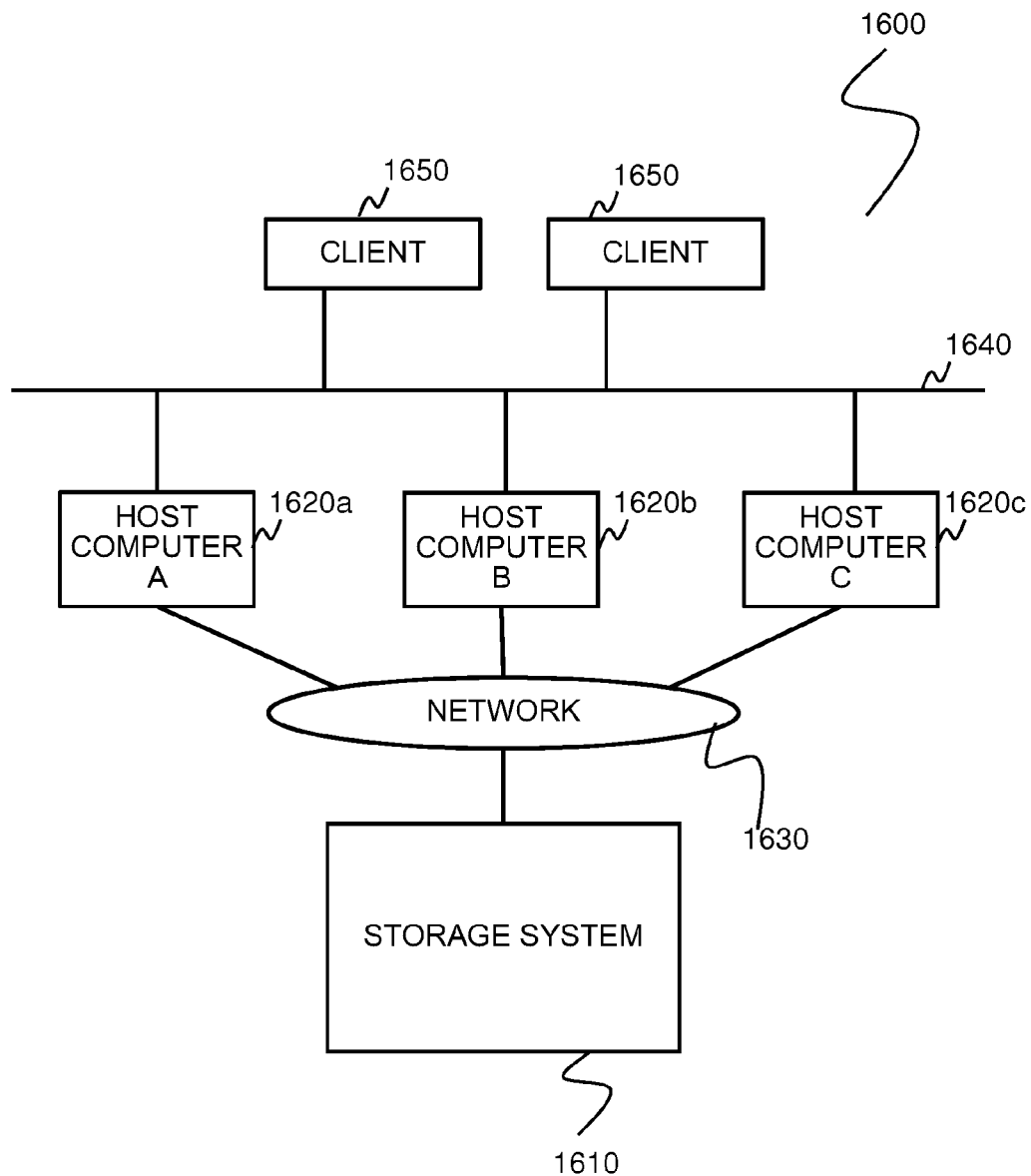
FIG. 19 is a configuration diagram of a computer system according to Embodiment 3.

FIG. 19 illustrates a configuration of a computer system 1600 to which the present invention is applied. According to the computer system 100 of Embodiment 1, the host virtual machines 150 existed in the integrated storage system 110, but according to the present computer system 1600, a configuration is adopted where a storage system 1610 and multiple host computers 1620a, 1620b and 1620c are respectively physically independent, and are connected via a network 1630. Further, the respective host computers 1620a, 1620b and 1620c can be connected to one or more clients 1650 via a LAN 1640, but the LAN 1640 and the client 1650 are not indispensible components for executing the present invention.

Figure 20:
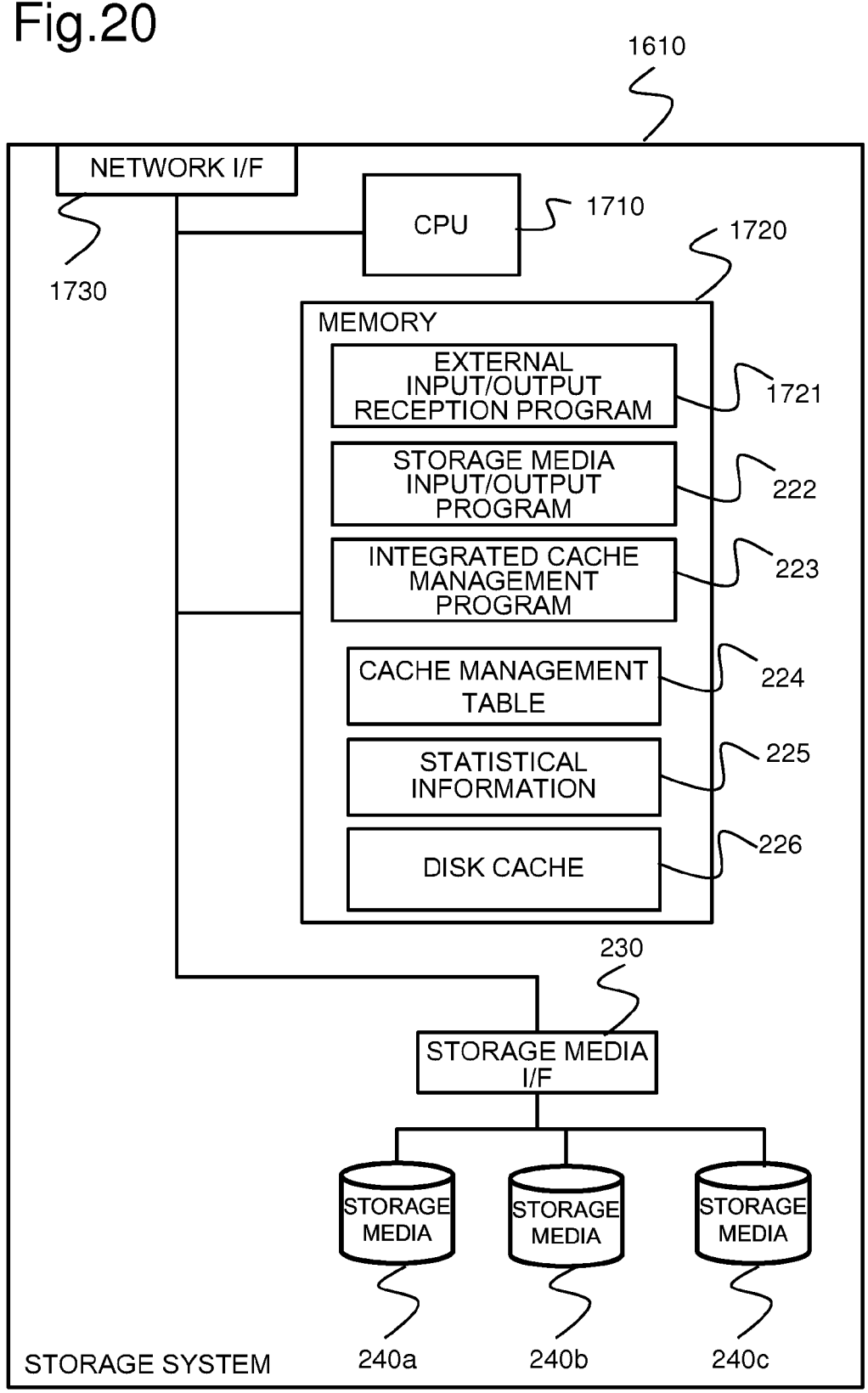
FIG. 20 is a configuration diagram of a storage system according to Embodiment 3.

FIG. 20 illustrates a configuration diagram of the storage system 1610. The storage system 1610 is composed of a CPU 1710, a memory 1720, a storage media interface (storage media I/F) 230, a network interface (network I/F) 1730, and a storage media 240 (240a, 240b, 240c). The CPU 1710 reads the various programs in the memory 1720, and based on the instructions from the programs, controls the various components of the storage system 1610.

The storage media input/output program 222, the integrated cache management program 223, the cache management table 224, the statistical information 225 and the disk cache 226 in the memory 1720, and the storage media interface 230 and the storage media 240 are the same as those in the integrated storage system 110 of Embodiment 1. An external input/output reception program 1721 receives an input/output request from a host computer 1620 via the network interface 1730, and performs an input/output processing to the storage media 240. The network interface 1730 is used to transfer data to the host computer 1620 via the network 1630 or to exchange cache management information with the host computer 1620. The communication via the network interface 1730 can use, for example, Fibre Channel, FCoE (Fibre Channel over Ethernet), SAN (Storage Area Network) using iSCSI (Internet Small Computer System Interface), or TCP/IP (Transmission Control Protocol/Internet Protocol).

Figure 21:
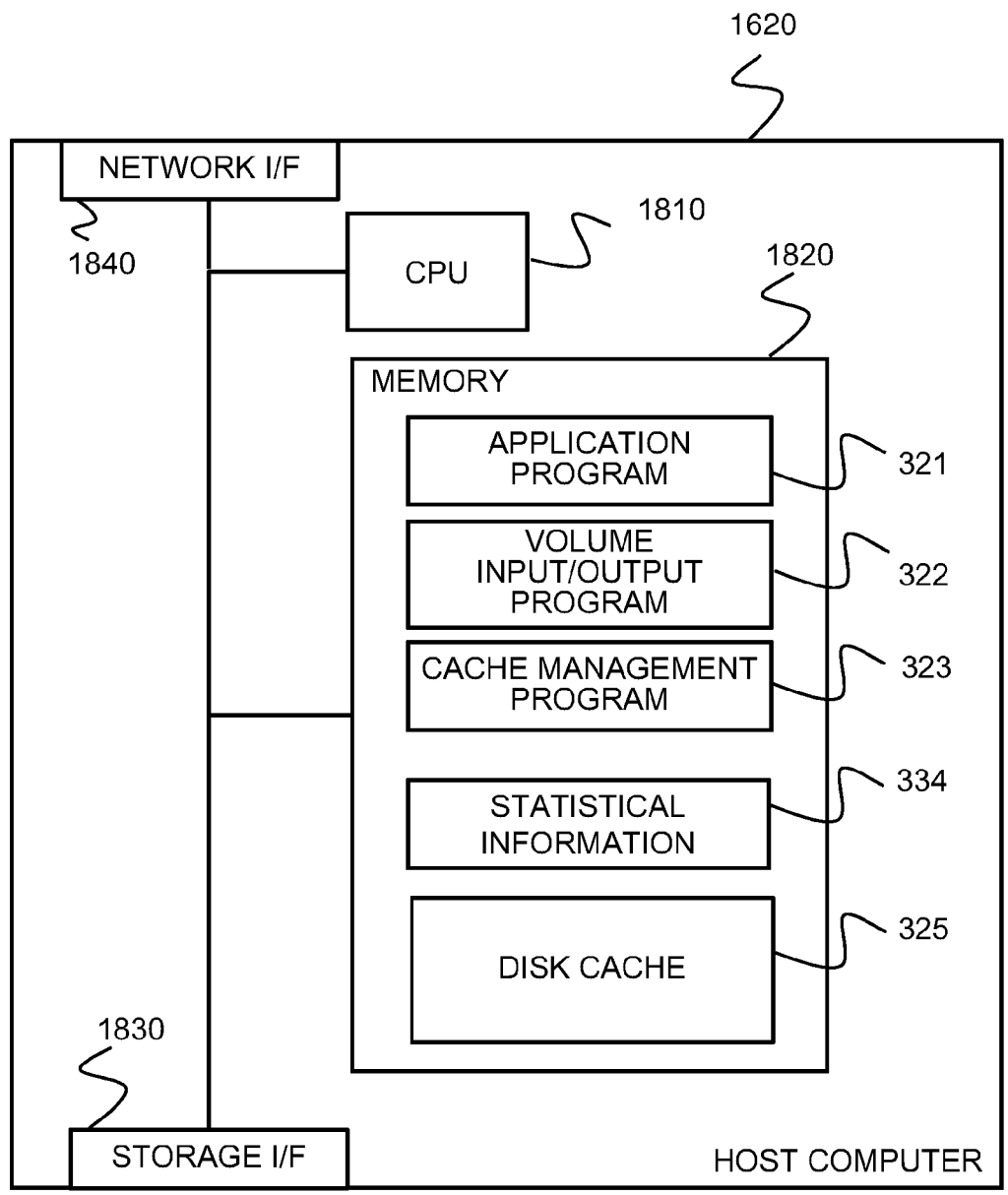
FIG. 21 is a configuration diagram of a host computer according to Embodiment 3.

FIG. 21 illustrates a configuration diagram of the host computer 1620. The host computer 1620 is composed of a CPU 1810, a memory 1820, a storage interface (storage I/F) 1830, and a network interface (network I/F) 1840. The CPU 1810 reads various programs within the memory 1820, and based on the instructions from the programs, controls the respective components of the host computer 1620.

The application program 321, the volume input/output management program 322, the cache management program 323, the statistical information 334 and the disk cache 325 in the memory 1820 are the same as those in the host virtual machine 150 according to Embodiment 1. Further, the storage interface 1830 is the same as the network interface 1730 of the storage system 1610, and used for transferring data between the host computer 1620 and the storage system 1610 via the network 1630. The network interface 1840 is used for communicating with the client 1650 via the LAN 1640.

Similar to the host virtual machine 150 of Embodiment 1, the respective host computers 1620 can access the volume formed of the storage media by the storage system 1610 in a shared manner, and can retain (cache) the replica of the respective chunk data of the volume in their own disk caches. Further, the storage system 1610 and the host computer 1620 performs a similar process as the process (processing flows 600, 700, 800, 900, 1000 and 1050) executed by the integrated storage system 110 and the host virtual machines 150 of Embodiment 1, excluding the point that in the present embodiment, communication is performed via the network 1630 instead of via the internal communication path. Thereby, similar to the integrated storage system 110 and the host virtual machine 150 according to Embodiment 1, it becomes possible to eliminate the state where data replica of the same chunk exists in a superposed manner in mutual disk caches.

By applying in the present invention, it becomes possible to prevent multiple host computers from maintaining the replica of the chunks in the volume including the same content, so that the limited disk cache areas can be utilized efficiently and the execution speed of the application program 321 can be improved.

The embodiments of the present invention have been described, but they are merely examples for illustrating the present invention, and they are not intended to restrict the present invention in any way. The present invention is applicable to other various examples. For example, according to the computer system described in the embodiments, it is possible to adopt a configuration where multiple components such as CPUs exist within the host computer. It is also possible to adopt a configuration where a portion or all of the components illustrated as programs in the present embodiments are realized via hardware using hard wired logic or the like. Furthermore, it is possible to adopt a configuration where the various programs and control information within the embodiments are provided by storing the same in storage media such as DVDs.

REFERENCE SIGNS LIST

100: Computer system
110: Integrated storage system
120: Virtual machine processing unit
130: Storage media
141: Chunk data
142: Chunk data
143: Chunk data
150a: Host virtual machine
150b: Host virtual machine
150c: Host virtual machine
151: Replica chunk
152: Replica chunk
223: Integrated cache management program
224: Cache management table
226: Disk cache
321a: Application program
321b: Application program
321c: Application program
323a: Cache management program
323b: Cache management program
323c: Cache management program
325a: Disk cache
325b: Disk cache
325c: Disk cache

The invention claimed is:

1. A computer system, comprising:
   multiple host computers and a storage system connected to the multiple host computers via a network, the storage system storing a plurality of pieces of data;
   wherein each of the multiple host computers has a cache area for retaining a replica of a piece of data of the plurality of pieces of data stored in the storage system;
   wherein each of the multiple host computers are configured to enable access to a same area in a storage media included in the storage system;
   wherein the storage system includes a memory including a disk cache having a cache area configured to retain a replica of a piece of data of the plurality of pieces of data stored in the storage system,
   wherein, upon receiving a read request to read a piece of data, a first host computer of the multiple host computers, determines whether the cache area of the first host computer retains a replica of the piece of data,
   if the first host computer does not retain a replica of the piece of data:
      the first host computer allocates an area of the cache area of the first host computer to retain a replica of the piece of data,
      determines whether the cache area of the disk cache retains a replica of the piece of data,
      if the cache area of the disk cache retains a replica of the piece of data, the replica of the piece of data is returned to the allocated area of the cache area of the first host computer,
      if the cache area of the disk cache does not retain a replica of the piece of data, an area of the cache area of the disk cache is allocated to store a replica of the piece of data, and the first host computer determines whether a cache area of a different host computer, of the multiple host computers, retains a replica of the piece of data and if so, the replica of the piece of data is returned to the allocated area of the cache area of the disk cache, and is then returned to the allocated area of the cache area of the first host computer,
      if a different host computer does not retain a replica of the piece of data, the piece of data is acquired from the area of the storage system and is returned to the allocated area of the cache area of the first host computer,
   when the first host computer retains a replica of the piece of data or the piece of data, then the replica of the piece of data or the piece of data requested by the read request is read from the cache area of the first host computer,
   wherein the memory of the storage system stores management information including: statistics for each piece of data indicating at least a last write time, a last read time, a write frequency of writes per unit of time, and a read frequency of reads per the unit of time, and information indicating one or more locations of replicas of the respective pieces of data among the cache areas of the multiple host computers and the disk cache for each piece of data,
   wherein, after the first host computer receives a read request to read the piece of data, the computer system causes only one replica of a piece of data of the area in the storage media to be cached in one cache area among the cache areas of the multiple host computers and the disk cache,
   wherein the computer system determines which cache area of the multiple host computers and the disk cache retains the one replica of a piece of data based on the statistics for each piece of data,
   wherein the computer system determines, based on the management information, whether a piece of data is accessed by multiple host computers or is accessed only by one of the multiple host computers,
   wherein if it is determined that a piece of data is accessed by multiple host computers, a replica of a piece of data is retained only in the disk cache of the storage system, and
   wherein if it is determined that only one host computer of the multiple host computers accesses the piece of data, a replica of the piece of data is retained in only the cache area of the one host computer.

2. The computer system according to claim 1, wherein when the host computer starts a write processing to the area in the storage media, the computer system deletes a replica of a piece of data in the area from the cache areas of the host computers other than the host computer that started the write processing; and
   after the deleting is performed, the host computer having started the write processing stores a write data accompanying the write processing to a cache partial region, and completes the write processing at the point of time when the write data is stored in the cache partial region.

3. The computer system according to claim 1, wherein each of the multiple host computers are virtual machines.

* * * * *